(12) United States Patent
Shenfield et al.

(10) Patent No.: US 7,493,594 B2
(45) Date of Patent: *Feb. 17, 2009

(54) SYSTEM AND METHOD FOR DESIGNING COMPONENT BASED APPLICATIONS

(75) Inventors: Michael Shenfield, Richmond Hill (CA); Bryan R. Goring, Milton (CA); David DeBruin, Guelph (CA)

(73) Assignee: Research In Motion, Waterloo, ON (CA)

( * ) Notice: Subject to any disclaimer, the term of this patent is extended or adjusted under 35 U.S.C. 154(b) by 509 days.

This patent is subject to a terminal disclaimer.

(21) Appl. No.: 11/078,427

(22) Filed: Mar. 14, 2005

(65) Prior Publication Data

US 2006/0206863 A1    Sep. 14, 2006

(51) Int. Cl.
*G06F 9/44* (2006.01)
(52) U.S. Cl. .................. 717/107; 717/102; 717/104; 717/108; 717/109; 717/138; 717/143
(58) Field of Classification Search ......... 717/107–109, 717/116, 121–122
See application file for complete search history.

(56) References Cited

U.S. PATENT DOCUMENTS

| | | | | |
|---|---|---|---|---|
| 6,104,874 | A * | 8/2000 | Branson et al. | 717/108 |
| 6,226,789 | B1 * | 5/2001 | Tye et al. | 717/138 |
| 6,272,672 | B1 * | 8/2001 | Conway | 717/107 |
| 6,993,743 | B2 * | 1/2006 | Crupi et al. | 717/102 |
| 7,000,219 | B2 * | 2/2006 | Barrett et al. | 717/107 |
| 7,076,703 | B1 * | 7/2006 | Le et al. | 714/711 |
| 7,178,129 | B2 * | 2/2007 | Katz | 717/108 |
| 7,219,327 | B1 * | 5/2007 | Jacobs et al. | 717/104 |
| 7,266,806 | B2 * | 9/2007 | Choi et al. | 717/108 |
| 7,272,819 | B2 * | 9/2007 | Seto et al. | 717/109 |
| 7,296,263 | B1 * | 11/2007 | Jacob | 717/143 |
| 2004/0003400 | A1 | 1/2004 | Carney et al. | |
| 2004/0177335 | A1 | 9/2004 | Beseigiel et al. | |

* cited by examiner

OTHER PUBLICATIONS

Xiulan Yu et al., "WCSE: A flexible web service composition environment" Web Services. 2004. Proceedings. IEEE International conference on San Diego, CA, USA Jul. 6-9, 2004.

*Primary Examiner*—Wei Y Zhen
*Assistant Examiner*—Phillip H Nguyen
(74) *Attorney, Agent, or Firm*—Gowling, Lafleur, Henderson LLP

(57) ABSTRACT

A system and method for providing a user interface system to develop an application having a first component with descriptors expressed in a structured definition language and a second component expressed as a series of instructions. The individual components interact for processing messages on a runtime environment of a device that are received from a data source over a network. The component applications comprise data components, presentation components, and message components, which are written in XML code. The component applications further comprise workflow components which are written in a subset of ECMAScript, and are augmented with the XML code. The user interface system comprises a first module, such as a viewer or and editor, for developing the definitions of the first component through interaction with a data model that provides a persistent state of the application. The user interface system comprises a second module for developing the instructions of the second component through interaction with the data model. and a backend connector for providing the message mapping information of the data source to the first module. The first module generates the definitions based on the mapping information. The first and second components developed by respective the first and second modules are included in the application with other components where applicable.

21 Claims, 9 Drawing Sheets

SYSTEM AND METHOD FOR DESIGNING COMPONENT BASED APPLICATIONS

BACKGROUND

This application relates generally to development of component based applications and their availability over a network.

There is a continually increasing number of terminals and mobile devices in use today, such as smart phones, PDAs with wireless communication capabilities, personal computers, self service kiosks and two-way pagers/communication devices. Software applications which run on these devices increase their utility. For example, a smart phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for for a variety of devices remains a difficult and time-consuming task.

Currently, mobile communication devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of mobile device, thereby providing a relatively optimized application program for each runtime environment. However, native applications have a disadvantage of not being platform independent, thereby necessitating the development of multiple versions of the same application, as well as being relatively large in size, thereby taxing the memory resources of the mobile device. Further, application developers need experience with programming languages such as Java TM and C++ to construct these hard coded native applications. There is a need for application development environments that can facilitate the generation of applications for selected devices and terminals with their respective runtime environment, as well as being capable of selecting from a variety of back-end data sources.

Systems and methods disclosed herein provide a component based application design environment to obviate or mitigate at least some of the above presented disadvantages.

SUMMARY

Current software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task. Current application design environments are not based on component application architecture, which facilitates generation of an application for running on clients having a wide variety of runtime environments. Native applications are an example of current applications which have disadvantages of not being platform independent, thereby necessitating the development multiple versions of the same application, as well as being relatively large in size, thereby taxing the memory resources of the mobile device. Contrary to current application development environments, system and method is given for providing a user interface system to develop an application having a first component with descriptors expressed in a structured definition language and a second component expressed as a series of instructions. The individual components interact for processing messages on a runtime environment of a device that are received from a datasource over a network. The component applications comprise data components, presentation components, and message components, which are written in XML code. The component applications further comprise workflow components which are written in a subset of ECMAScript, and augmented with XML code. The user interface system comprises a first module, such as a viewer or and editor, for developing the definitions of the first component through interaction with a data model that provides a persistent state of the application. The user interface system comprises a second module for developing the instructions of the second component through interaction with the data model and a backend connector for providing the message mapping information of the data source to the first module. The first module generates the definitions based on the mapping information. The first and second components developed by respective the first and second modules are included in the application with other components where applicable.

Accordingly, user interface system is provided for developing an application having a first component with descriptors expressed in a structured definition language and a second component expressed as a series of instructions, the individual components interacting for processing messages on a runtime environment of a device that are received from a datasource over a network, the system comprising: a first module for developing the definitions of the first component through interaction with a data model, the model for providing a persistent state of the application; a second module for developing the instructions of the second component through interaction with the data model; and a backend connector for providing the message mapping information of the data source to the first module, the first module generating the definitions based on the mapping information; wherein the first and second components developed by respective the first and second modules are included in the application.

Also disclosed is a method for developing an application having a first component with descriptors expressed in a structured definition language and a second component expressed as a series of instructions, the individual components interacting for processing messages on a runtime environment of a device that are received from a datasource over a network, the method comprising the steps of: developing the definitions of the first component through interaction with a data model, the model for providing a persistent state of the application; developing the instructions of the second component through interaction with the data model; and providing the message mapping information of the data source for assisting the generation of the definitions based on the mapping information; wherein the developed first and second components are included in the application.

Also disclosed is a a computer program product for developing an application having a first component with descriptors expressed in a structured definition language and a second component expressed as a series of instructions, the individual components interacting for processing messages on a runtime environment of a device that are received from a datasource over a network, the computer program product comprising: a computer readable medium; a first module stored on the computer readable medium for developing the definitions of the first component through interaction with a data model, the model for providing a persistent state of the application; a second module stored on the computer readable medium for developing the instructions of the second component through interaction with the data model; and a back-end connector unit stored on the computer readable medium for providing the message mapping information of the data source to the first module, the first module generating the definitions based on the mapping information; wherein the first and second components developed by respective the first and second modules are included in the application.

BRIEF DESCRIPTION OF THE DRAWINGS

These and other features will become more apparent in the following detailed description in which reference is made to the appended drawings wherein.

DESCRIPTION

Network System

Figure 1:
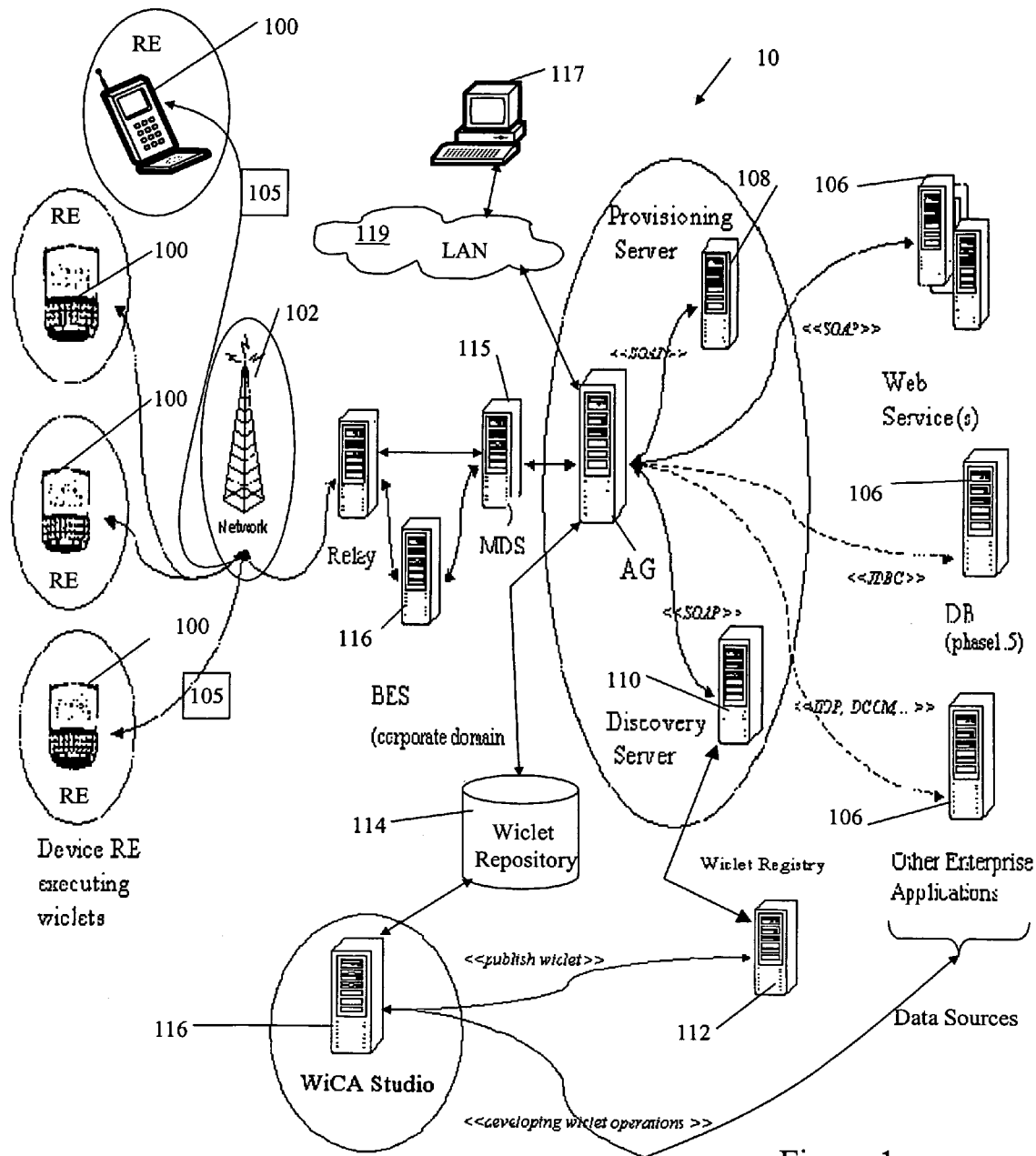
FIG. 1 is a block diagram of a communication network system.

Referring to FIG. 1, a network system 10 comprises mobile communication devices 100 for interacting with one or more backend data sources 106 (e.g. a schema based service such as web service or database that provides enterprise services used by an application 105) via a wireless network 102 coupled to an application gateway AG. The devices 100 are devices such as but not limited to mobile telephones, PDAs, two-way pagers, dual-mode communication devices. The network 10 can also have desktop computers 117 coupled though a local area network 119. The devices 100 and desktop computers 117 of the network 10 are hereafter referred to as the devices 100 for the sake of simplicity. It is recognised that the application gateway AG and data sources 106 can be linked via extranets (e.g. the Internet) and/or intranets as is known in the art. The application gateway AG handles request/response messages initiated by the application 105 as well as subscription notifications pushed to the device 100 from the data sources 106. The Application Gateway AG can function as a Data Mapping Server for mediating messaging between a client runtime RE on the device 100 and a backend server of the data sources 106. The Runtime Environment RE is an intelligent container that executes application 105 components and provides common services as needed for execution of the applications 105. The gateway AG can provide for asynchronous messaging for the applications 105 and can integrate and communicate with legacy back-end data sources 106. The devices 100 transmit and receive the Wireless Component Applications technology or wireless component applications 105, as further described below, when in communication with the data sources 106, as well as transmit/receive messaging associated with operation of the applications 105. The devices 100 can operate as web clients of the data sources 106 through execution of the applications 105 when provisioned on respective runtime environments RE of the devices 100.

For satisfying the appropriate messaging associated with the applications 105, the application gateway AG communicates with the data sources 106 through various protocols (such as but not limited to HTTP, SQL, and component API) for exposing relevant business logic (methods) to the applications 105 once provisioned on the devices 100. The applications 105 can use the business logic of the data sources 106 similarly to calling a method on an object (or a function). It is recognized that the applications 105 can be downloaded/ uploaded in relation to data sources 106 via the network 102 and application gateway AG directly to the devices 100. For example, the application gateway AG is coupled to a provisioning server 108 and a discovery server 110 for providing a mechanism for optimized over-the-air provisioning of the applications 105, including capabilities for application 105 discovery from the device 100 as listed in a UDDI (for example) registry 112. The Registry 112 can be part of the Discovery Service implemented by the server 110, and the registry 112 is used for publishing the applications 105. The application 105 information in the registry 112 can contain such as but not limited to a Deployment Descriptor DD (contains information such as application 105 name, version, and description) as well as the location of this application 105 in an application repository 114.

Referring again to FIG. 1, for initialization of the runtime environment RE, the RE receives the gateway AG URL and the gateway AG public key in a MDS 115 service book. The runtime environment RE uses this information to connect to the gateway AG for initial handshaking. Device 100 provisioning or BES 116, depending on the domain, pushes the MDS 115 service book to the device 100. It is recognised there could be more than one gateway AG in the network 10, as desired. Once initialized, access to the applications 105 by the devices 100, as downloaded/uploaded, can be communicated via the gateway AG directly from the application repository 114, and/or in association with data source 106 direct access (not shown) to the repository 114.

Application Design User Interface System or Tool 116

Figure 3:
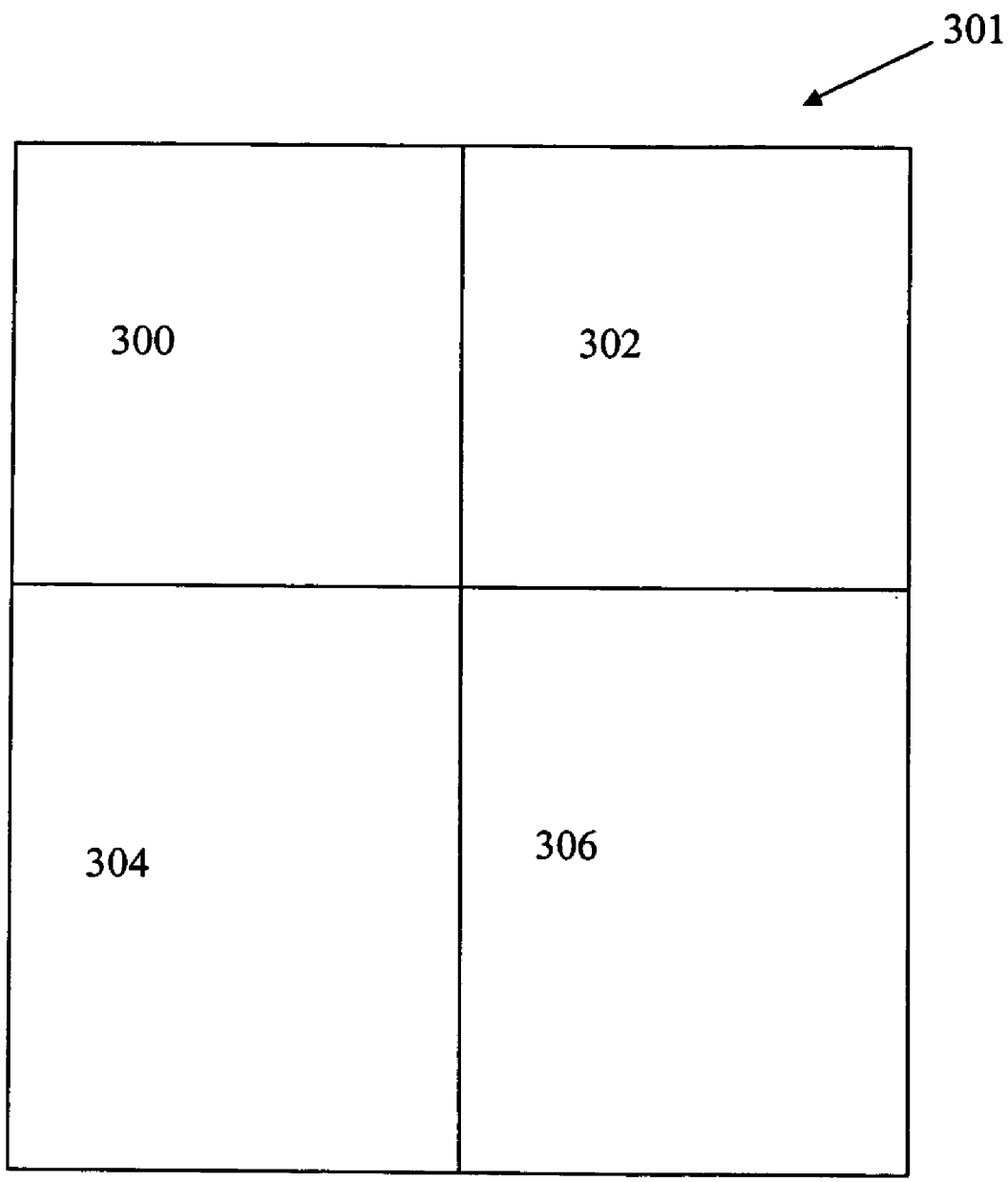
FIG. 3 is a block diagram of a component application package of FIG. 1.

Referring to FIG. 3, the applications 105 can be stored in the repository 114 as a series of packages that can be created by a Studio developer tool 116, which is employed by developers of the applications 105. The developer design tool 116 can be a RAD tool used to develop the Wired and/or Wireless Component Applications technology 105 packages (or "wireless component applications" ). The tool 116 can provide support for a drag-and drop graphical approach for the visual design of application 105 components (see FIG. 4) such as but not limited to screens 402, data elements 400, messages 404 and application workflow logic 406, as further defined below. The application 105 packages are represented as metadata (XML) that can be generated automatically by the tool 116 through an automatic code generation process. This tool 116 can provide for the automatic generated code to be augmented by an industrystandard scripting language (e.g. JavaScriptTM) or other scripting languages known in the art. The availability of the application 105 packages of the repository 114 are published via the discovery service of the server 110 in the registry 112. It is recognized that there can be more than one repository 114 and associated registries 112 as utilized by the particular network 10 configuration of the application gateway AG and associated data sources 106.

Figure 2:
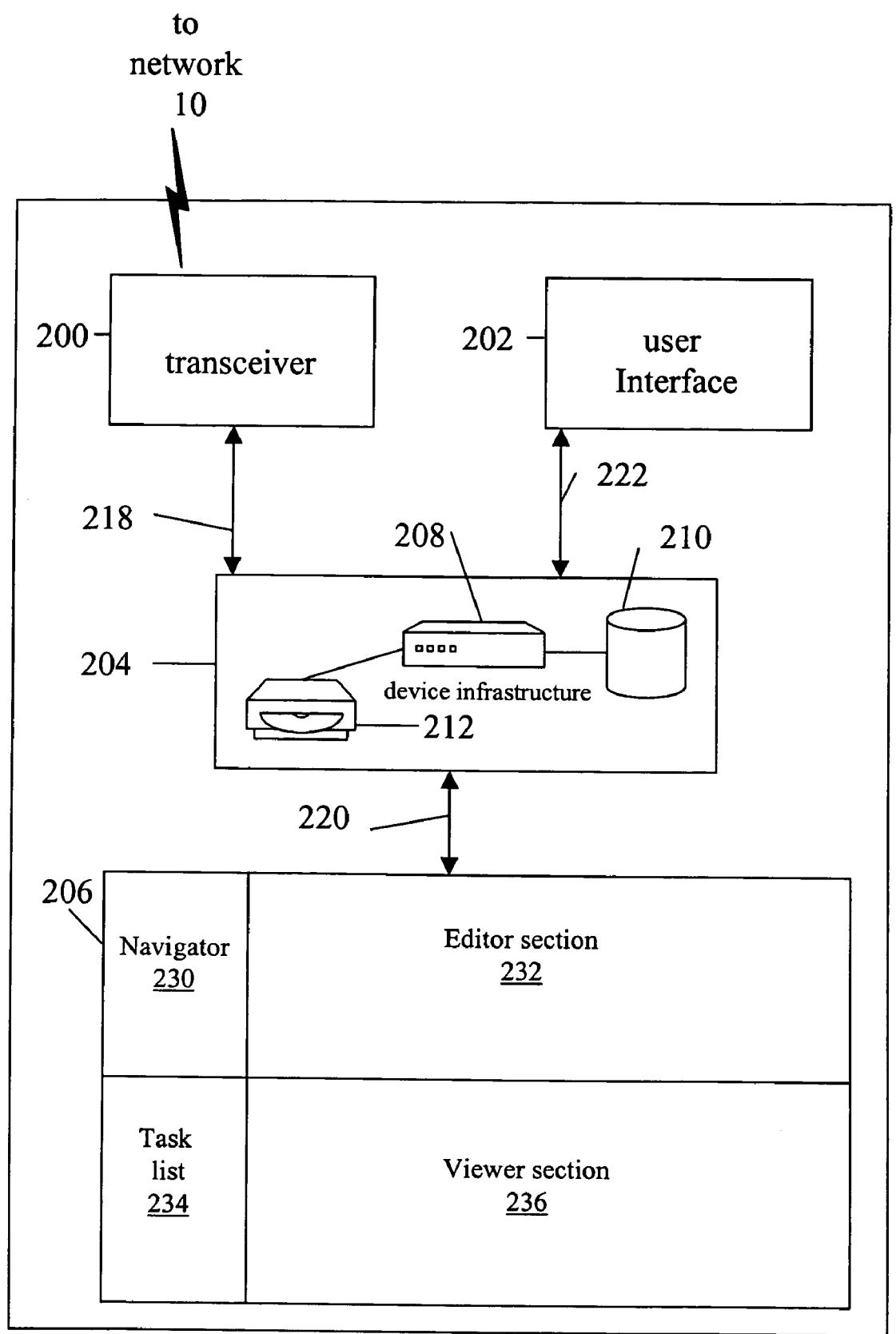
FIG. 2 is a block diagram of an user interface system for developing applications of FIG. 1.

Referring to FIG. 2, the tool 116 is operated on a computer 201 that can be connected to the network 10 via a network connection interface such as a transceiver 200 coupled via connection 218 to a device infrastructure 204. The transceiver 200 can be used to upload completed application programs 105 to the repository 114 (see FIG. 1), as well as access the registry 112 and selected data sources 106. Referring again to FIG. 2, the developer design tool 116 also has a user interface system 202, coupled to the device infrastructure 204 by connection 222, to interact with a user (not shown). The user interface system 202 includes one or more user input devices such as but not limited to a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface system 202 is employed by the user of the tool 116 to coordinate the design of applications 105 using a series of editors 600 and viewers 602 (see FIG. 6).

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface system 202 and the display 206 of the tool 116 by executing related instructions, which are provided by an operating system and application 105 design editors 600 and viewers 602 resident in the memory module 210. Further, it is recognized that the device infrastructure 204 can include a computer readable storage medium 212 coupled to the processor 208 for providing instructions to the processor and/or to load/design the applications 105 also resident (for example) in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the design tool 116 is operated on the computer 201 as an application development environment for developing the applications 105 or wireless component applications. The development methodology of the tool 116 can be based on a visual "drag and drop" system of building the application visual, data, messaging behaviour, and runtime navigation model. The tool 116 can be structured as a set of plug-ins to a generic integrated design environment (IDE) framework, such as but not limited to the Eclipse framework, or the tool 116 can be configured as a complete design framework without using plug-in architecture. For exemplary purposes only, the tool 116 will now be described as a plug-in design environment using the Eclipse framework.

Figure 6:
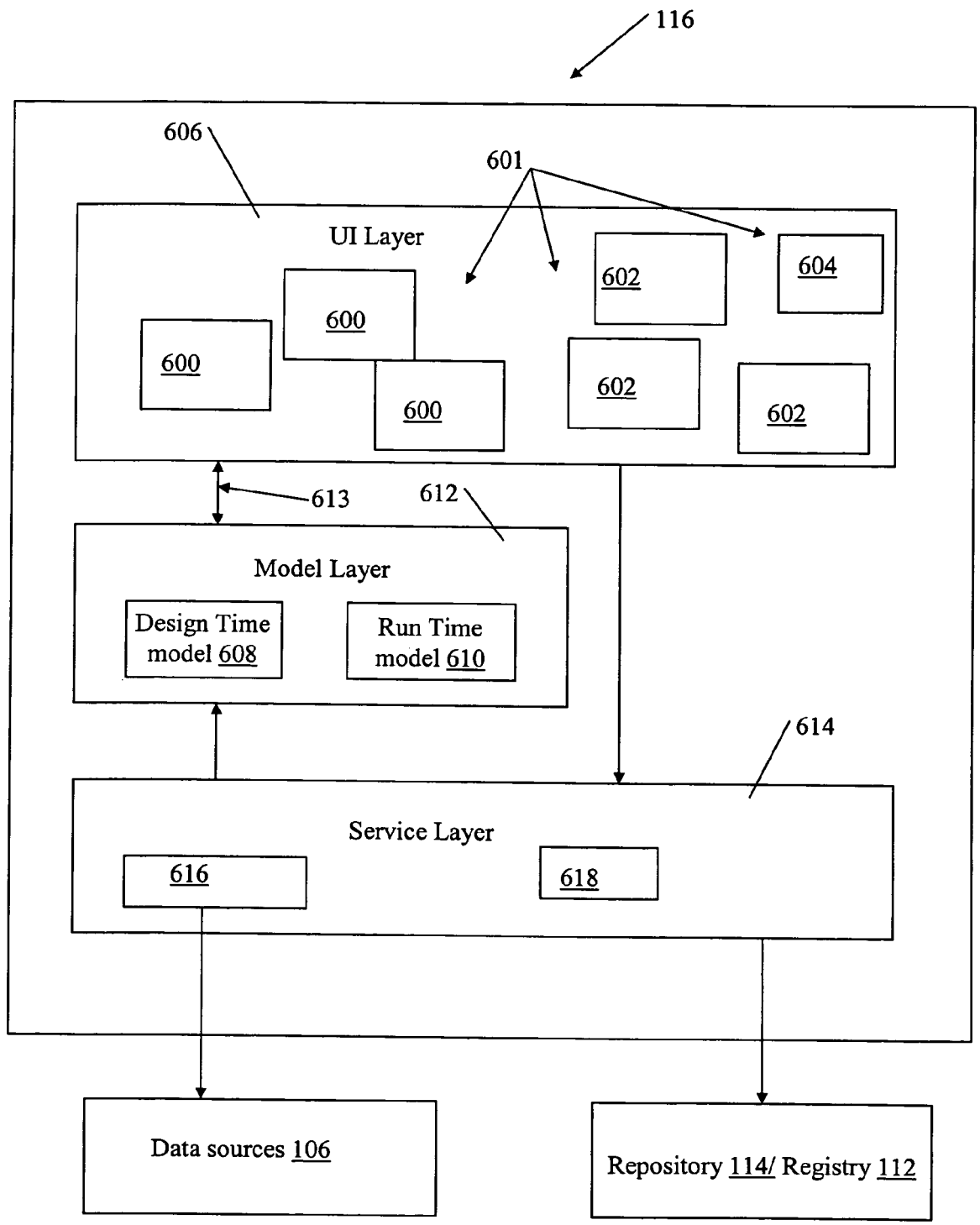
FIG. 6 is a block diagram of the developer tool architecture of FIG. 2.

Referring to FIGS. 2 and 6, Eclipse makes provisions for a basic, generic tool 116 environment that can be extended to provide custom editors, wizards, project management and a host of other functionality. The Eclipse Platform is designed for building integrated development environments (IDEs) that can be used to create applications as diverse as web sites, embedded Java™ programs, C++ programs, and Enterprise JavaBeans™. The navigator view 230 shows files in a user's (e.g. developer) workspace; a text editor section 232 shows the content of a file being worked on by the user of the tool 116 to develop the application 105 and associated components 400, 402, 404, 406 (see FIG. 4) in question; the tasks view section 234 shows a list of to-dos for the user of the tool 116; and the outline viewer section 236 shows for example a content outline of the application 105 being designed/edited, and/or may augment other views by providing information about the currently selected object such as properties of the object selected in another view. It is recognised that the tool 116 aids the developer in creating and modifying the coded definition content of the components 400, 402, 404 in the structured definition language (e.g. in XML). Further, the tool 116 also aids the developer in creating, modifying, and validating the interdependencies of the definition content between the components 400, 402, 404, such as but not limited to message/data and screen/data relationships.

The Eclipse Platform is built on a mechanism for discovering, integrating, and running modules called plug-ins (i.e. editors 600 and viewers 602). When the Eclipse Platform is launched via the UI 202 of the computer 201, the user is presented with an integrated development environment (IDE) on the display 206 composed of the set of available plug-ins, such as editors 600 and viewers 602. The various plug-ins to the Eclipse Platform operate on regular files in the user's workspace indicated on the display 206. The workspace consists of one or more top-level projects, where each project maps to a corresponding user-specified directory in the file system, as stored in the memory 210 (and/or accessible on the network 10), which is navigated using the navigator 230. The Eclipse Platform UI paradigm is based on editors, views, and perspectives. From the user's standpoint, a workbench display 206 consists visually of views 602 and editors 600. Perspectives manifest themselves in the selection and arrangements of editors 600 and views 602 visible on the display 206. Editors 600 allow the user to open, edit, and save objects. The editors 600 follow an open-save-close lifecycle much like file system based tools. When active, a selected editor 600 can contribute actions to a workbench menu and tool bar. Views 602 provide information about some object that the user is working with in the workbench. A viewer 602 may assist the editor 600 by providing information about the document being edited. For example, viewers 602 can have a simpler lifecycle than editors 600, whereby modifications made in using a viewer 602 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 602 and editors 600 that are arranged (tiled, stacked, or detached) for presentation on the display 206.

Component Applications 105

Referring to FIG. 3, the application 105 packages have modules 301 such as but not limited to XML definitions 300, mappings 302, application resources 304, and optionally resource bundle(s) 306 for localization support. XML definitions 300 are XML coding of application data 400, messages 404, screens 402 components and workflow 406, part of the raw application 105. It is recognised that XML syntax is used only as an example of any structured definition language applicable to coding of the applications 105. Application mapping 302 defines relationship of content in application messaging to backend operation of the data sources 106. The application developer creates the mappings 302 using the Studio tool 116, whereby the gateway AG utilizes this mapping information during communication of the application 105 request/response messages between the runtime RE, of the devices 100, and the data sources 106. The resources 304 are one or more resources (images, soundbytes, media, etc . . . ) that are packaged with the application 105 as static dependencies. For example, resources 304 can be located relative to a resources folder (not shown) such that a particular resource may contain its own relative path to the main folder (e.g. resources/icon.gif, resources/screens/clipart_1.0/happyface.gif, and resources/soundbytes/midi/inthemood.midi). The resource bundles 306 can contain localization information for each language supported by the application 105. These bundles can be locatred in a locale folder, for example, and can be named according to the language supported (e.g. locale/lang_en.properties and locale/lang_fr.properties).

It is recognised that the runtime environment RE of the device 100 is the client-resident container within which the applications 105 are executed on the device 100. The container manages the application 105 lifecycle on the device 100 (provisioning, execution, deletion, etc.) and is responsible for translating the metadata (XML) representing the application 105 into an efficient executable form on the device 100. The application 105 metadata is the executable form of the XML definitions 300, as described above, and is created and maintained by the runtime environment RE. The RE can provide a set of common services to the application 105, as well as providing support for optional JavaScript™ or other scripting languages. These services include support for such as but not limited to UI control, data persistence and asynchronous client-server messaging. It is recognised that these services could also be incorporated as part of the application 105, if desired.

Figure 4:
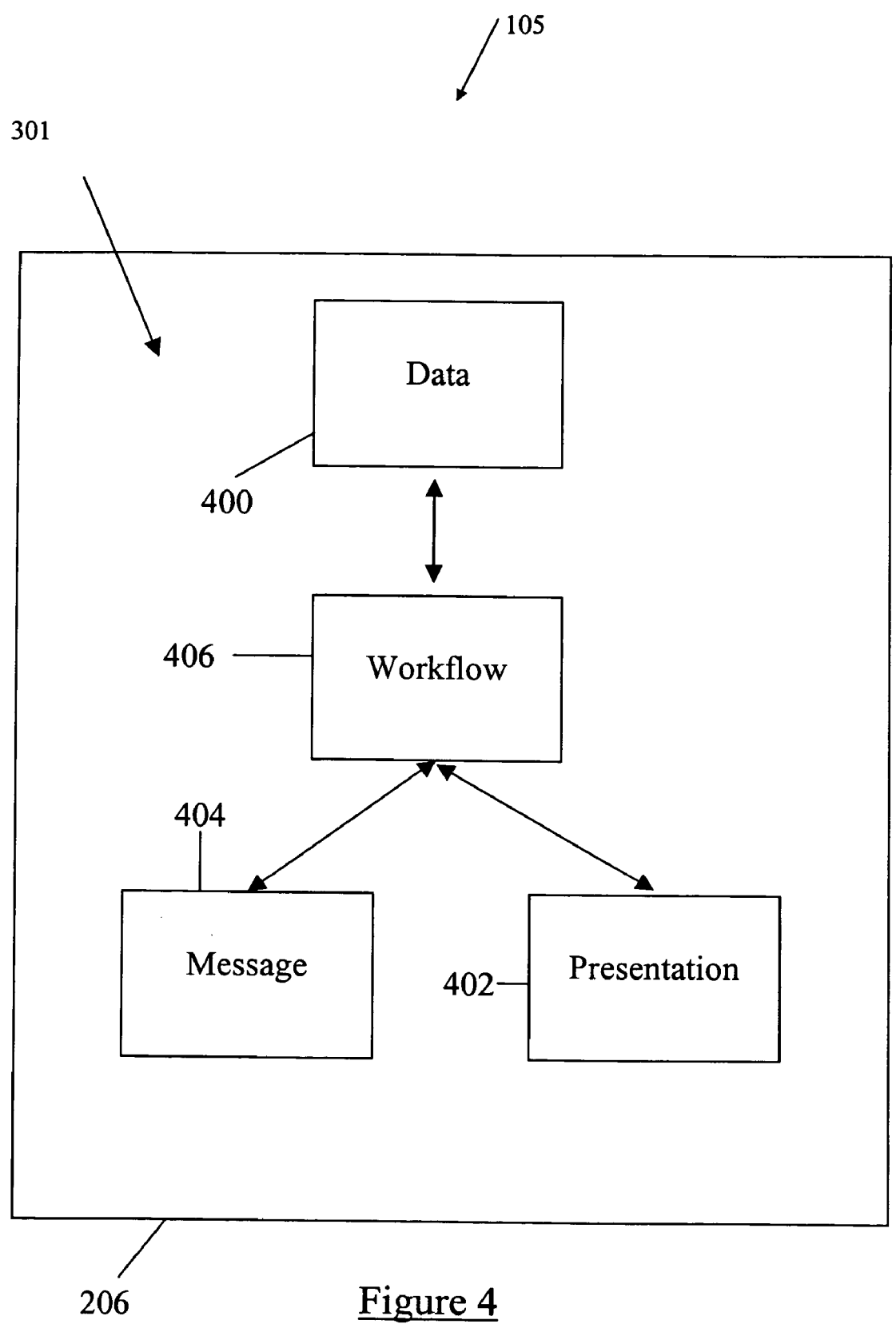
FIG. 4 is a block diagram illustrating example components of the application of FIG. 3.

Referring to FIG. 4, the component applications 105 are software applications which can have modules 301 written, for example, in eXtensible Markup Language (XML) and a subset of ECMAScript. XML and ECMAScript are standards-based languages which allow software developers to develop the component applications 105 in a portable and platform-independent way. A block diagram of the component application 105 comprises the data components 400, the presentation components 402 and the message components 404, which are coordinated by workflow components 406 through interaction with the client runtime environment RE of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the runtime environment RE (see FIG. 1), and encoding schemes include schemes such as but not limited to XML, HTML, XHTML, XSML, RDF, Machine Readable Cataloging (MARC), and Multipurpose Internet Mail Extensions (MIME). The client runtime environment RE of the device 100 operates on the metadata descriptors of the components 400, 402, 404 to provision an executable version of the application 105.

Referring again to FIG. 4, the data components 400 define data entities which are used by the component application 105. Data components 400 define what information is required to describe the data entities, and in what format the information is expressed. For example, the data component 400 may define information such as but not limited to an order which is comprised of a unique identifier for the order which is formatted as a number, a list of items which are formatted as strings, the time the order was created which has a datetime format, the status of the order which is formatted as a string, and a user who placed the order which is formatted according to the definition of another one of the data components 400.

Referring again to FIG. 4, the message components 404 define the format of messages used by the component application 105 to communicate with external systems such as the web service. For example, one of the message components 404 may describe information such as but not limited to a message for placing an order which includes the unique identifier for the order, the status of the order, and notes associated with the order. It is recognised that data definition content of the components can be shared for data 400 and message 404 components that are linked or otherwise contain similar data definitions.

Referring again to FIG. 4, the presentation components 402 define the appearance and behavior of the component application 105 as it displayed by a user interface system of the devices 100. The presentation components 402 can specify GUI screens and controls, and actions to be executed when the user interacts with the component application 105 using the user interface system. For example, the presentation components 402 may define screens, labels, edit boxes, buttons and menus, and actions to be taken when the user types in an edit box or pushes a button. It is recognised that data definition content of the components can be shared for data 400 and presentation 402 components that are linked or otherwise contain similar data definitions.

Referring to FIGS. 1 and 4, it is recognized that in the above described client component application 105 definitions hosting model, the presentation components 402 may vary depending on the client platform and environment of the device 100. For example, in some cases Web Service consumers do not require a visual presentation. The application definition of the components 400, 402, 404, 406 of the component application 105 can be hosted in the Web Service repository 114 as a package bundle of platform-neutral data 400, message 404, workflow 406 component descriptors with a set of platform-specific presentation component 402 descriptors for various predefined client runtimes RE. When the discovery or deployment request message for the application 105 is issued, the client type would be specified as a part of this request message. In order not to duplicate data, message, and workflow metadata while packaging component application 105 for different client platforms of the communication devices 100, application definitions can be hosted as a bundle of platform-neutral component definitions linked with different sets of presentation components 402. For those Web Service consumers, the client application 105 would contain selected presentation components 402 linked with the data 400 and message 404 components through the workflow components 406.

Referring again to FIG. 4, the workflow components 406 of the component application 105 define processing that occurs when an action is to be performed, such as an action specified by a presentation component 402 as described above, or an action to be performed when messages arrive from the application gateway AG (see FIG. 1). Presentation, workflow and message processing are defined by the workflow components 406. The workflow components 406 are written as a series of instructions in a programming language (e.g. object oriented programming language) and/or a scripting language, such as but not limited to EGMAScript, and can be (for example) compiled into native code and executed by the runtime environment 206, as described above. An example of the workflow components 406 may be to assign values to data, manipulate screens, or send the message 105. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are PerlTM RexxTM VBScriptTM, JavaScriptTM, and Tcl/Tk. The scripting languages, in general, are instructional languages that are used to manipulate, customize, and automate the facilities of an existing system, such as the devices 100.

Referring to FIG. 4, the application 105 is structured using component architecture such that when the device 100 (see FIG. 1) receives a response message from the application gateway AG containing message data, the appropriate workflow component 406 interprets the data content of the message according to the appropriate message component 404 definitions. The workflow component 406 then processes the data content and inserts the data into the corresponding data component 400 for subsequent storage in the device 100. Further, if needed, the workflow component 406 also inserts the data into the appropriate presentation component 402 for subsequent display on the display of the device 100. A further example of the component architecture of the applications 105 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, web service for example, as defined by the message component 404.

The following example, referring to FIG. 4, shows how a Web Services client application 105 could be expressed using a structured definition language, such as but not limited to XML, and a platform neutral scripting/programming language, such as but not limited to ECMAScript, with defined components conforming with the following Document Type Definition (DTD):

```
<!ELEMENT wcApp (desc?, iconUrl?, res*, wcData*, wcMsg*, style*, wcScr*, wcFlow)>
<!ATTLIST wcApp
    name CDATA #REQUIRED
    title CDATA #IMPLIED
    vendor CDATA #IMPLIED
    version CDATA #IMPLIED
    transportKey CDATA #IMPLIED
    installNotifURL CDATA #IMPLIED
    registerURL CDATA #IMPLIED
>
<!ELEMENT desc (#PCDATA)>
<!ELEMENT iconUrl (#PCDATA)>
<!ELEMENT res (#PCDATA)>
<!ATTLIST res
    name CDATA #REQUIRED
    url CDATA #REQUIRED
```

-continued

```
    type (xml | image | sound | any) #REQUIRED
    deferred (true | false) "false"
>
Example Data Component 400
<!ELEMENT wcData (dfield+)>
<!ATTLIST wcData
    name CDATA #REQUIRED
    persisted (true | false) "true"
>
<!ELEMENT dfield (#PCDATA)>
<!ATTLIST dfield
    name CDATA #REQUIRED
    type (String | Number | Boolean | Date | Any) "Any"
    array (true | false) "false"
    cmp (true | false) "false"
    cmpName CDATA #IMPLIED
    key (0 | 1 | 2) "0"
>
Example Message Component 404
<!ELEMENT wcMsg (mfield*)>
<!ATTLIST wcMsg
    name CDATA #REQUIRED
    mapping CDATA #IMPLIED
>
<!ATTLIST wcMsg
    pblock CDATA #IMPLIED
>
<!ELEMENT mfield (#PCDATA)>
<!ATTLIST mfield
    name CDATA #REQUIRED
    type (String | Number | Boolean | Date | Array | XML) #IMPLIED
    mapping CDATA #IMPLIED
>
Example Presentation Components 402
<!ELEMENT wcScr (layout?, menu?, refresh?, event?)>
<!ATTLIST wcScr
    name CDATA #REQUIRED
    title CDATA #IMPLIED
    main (true | false) "false"
    dialog (true | false) "false"
    param CDATA #IMPLIED
>
<!ELEMENT style (font?)>
<!ATTLIST style
    name CDATA #REQUIRED
    bgColor CDATA #IMPLIED
>
<!ELEMENT font EMPTY>
<!ATTLIST font
    name CDATA #REQUIRED
    color CDATA #IMPLIED
    size CDATA #IMPLIED
    bold (true | false) "false"
    italic (true | false) "false"
    underline (true | false) "false"
>
<!ELEMENT refresh (msg+)>
<!ELEMENT msg (#PCDATA)>
<!ELEMENT layout (layout*, label*, separator*, edit*, image*, choice*, button*, textarea*)>
<!ATTLIST layout
    type (grid | flow | border | vertical) #REQUIRED
    param CDATA #IMPLIED
    placement CDATA #IMPLIED
    style CDATA #IMPLIED
>
<!ELEMENT menu (item*)>
<!ELEMENT item (action, condition?)>
<!ATTLIST item
    name CDATA #REQUIRED
    label CDATA #REQUIRED
    shortcut CDATA #IMPLIED
>
<!ELEMENT action EMPTY>
<!ATTLIST action
    screen CDATA #IMPLIED
    pblock CDATA #IMPLIED
```

```
        param CDATA #IMPLIED
        acceptChanges (true | false) "true"
>
<!ELEMENT condition EMPTY>
<!ATTLIST condition
        pblock CDATA #REQUIRED
        param CDATA #IMPLIED
        result (true | false) "true"
>
<!ELEMENT event EMPTY>
<!ATTLIST event
        type (onInit | onClick | onChange | onFocusOut) "onInit"
        pblock CDATA #IMPLIED
        screen CDATA #IMPLIED
        param CDATA #IMPLIED
>
<!ELEMENT separator EMPTY>
<!ELEMENT label (condition?, event?)>
<!ATTLIST label
        name CDATA #REQUIRED
        value CDATA #REQUIRED
        placement CDATA #IMPLIED
        style CDATA #IMPLIED
>
<!ELEMENT edit (condition?, event?)>
<!ATTLIST edit
        name CDATA #REQUIRED
        value CDATA #IMPLIED
        mapping CDATA #IMPLIED
        type (char | number | date | pwd | phone | email) "char"
        readOnly (true | false) "false"
        placement CDATA #IMPLIED
        style CDATA #IMPLIED
>
<!ELEMENT textarea (condition?, event?)>
<!ATTLIST textarea
        name CDATA #REQUIRED
        value CDATA #IMPLIED
        mapping CDATA #IMPLIED
        readOnly (true | false) "false"
        placement CDATA #IMPLIED
        style CDATA #IMPLIED
>
<!ELEMENT image (condition?, event?)>
<!ATTLIST image
        name CDATA #REQUIRED
        resName CDATA #REQUIRED
        placement CDATA #IMPLIED
>
<!ELEMENT choice (condition?, event?, entry*)>
<!ATTLIST choice
        name CDATA #REQUIRED
        value CDATA #IMPLIED
        mapping CDATA #IMPLIED
        type (singleList | multiList | dropdown | checkbox | radio) "singleList"
        readOnly (true | false) "false"
        placement CDATA #IMPLIED
        style CDATA #IMPLIED
>
<!ELEMENT entry (#PCDATA)>
<!ELEMENT button (condition?, event?)>
<!ATTLIST button
        name CDATA #REQUIRED
        label CDATA #REQUIRED
        image (true | false) "false"
        placement CDATA #IMPLIED
        style CDATA #IMPLIED
>
Example Workflow Component 406
<!ELEMENT wcFlow (pblock+)>
<!ELEMENT pblock (#PCDATA)>
<!ATTLIST pblock
        id CDATA #REQUIRED
        param CDATA #IMPLIED
>
```

Figure 5:
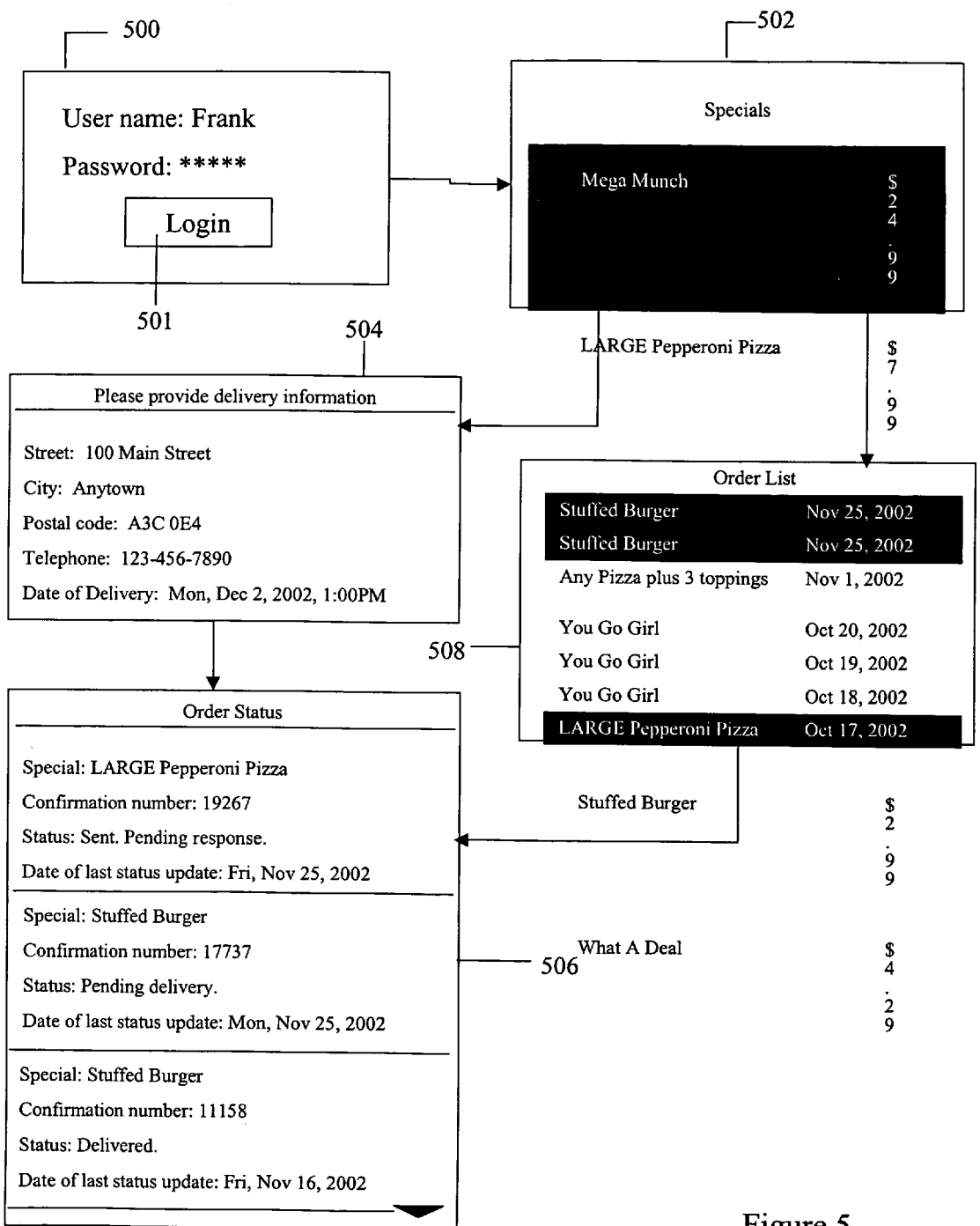
FIG. 5 shows example screens and workflow for a sample component application of FIG. 3.

The example component application program 105 displayed in FIG. 5 is represented in XML and mEScript as follows, including data components 400 as "wcData", message components 404 as "wcMsg", presentation components 402 as "wcScr" and workflow components 406 as "wcFlow" for processing the other components 400, 402, 404:

```
<!DOCTYPE wcApp SYSTEM "wcApp.dtd">
<wcApp name="WirelessPizza" title="Wireless Pizza" vendor="ARG" version="0.9">
    <desc> Order pizza from your wireless device. </desc>
    <iconUrl>http://www.example.com/wirelessPizzaIcon.png</iconUrl>
    <wcData name="User">
        <dfield name="name" type="String" key="1"/>
        <dfield name="passwordHash" type="String"/>
        <dfield name="street" type="String"/>
        <dfield name="city" type="String"/>
        <dfield name="postal" type="String"/>
        <dfield name="phone" type="String"/>
    </wcData>
    <wcData name="OrderStatus">
```

-continued

```
            <dfield name="confNumber" type="Number" key="1"/>
            <dfield name="status" type="String"/>
            <dfield name="datetime" type="Date"/>
    </wcData>
    <wcData name="Order">
            <dfield name="orderId" type="Number" key="1"/>
            <dfield name="special" type="String"/>
            <dfield name="user" cmp="true" cmpName="User"/>
            <dfield name="datetime" type="Date"/>
            <dfield name="orderStatus" cmp="true" cmpName="OrderStatus"/>
    </wcData>
    <wcData name="Special">
            <dfield name="desc" key="1" type="String"/>
            <dfield name="price" type="Number"/>
    </wcData>
    <wcMsg name="inAddSpecial" mapping="Special">
    </wcMsg>
    <wcMsg name="inRemoveSpecial" pblock="mhRemoveSpecial">
            <mfield name="desc" mapping="Special.desc"/>
    </wcMsg>
    <wcMsg name="inOrderStatus">
            <mfield name="orderId" mapping="Order.orderId"/>
            <mfield name="status" mapping="Order.orderStatus"/>
    </wcMsg>
    <wcMsg name="inUserInfo" mapping="User">
    </wcMsg>
    <wcMsg name="outOrder">
            <mfield name="special" mapping="Order.special"/>
            <mfield name="user" mapping="Order.user"/>
            <mfield name="datetime" mapping="Order.datetime"/>
    </wcMsg>
    <wcScr name="scrSpecials" title="Specials" main="true">
            <layout type="flow">
                    <choice name="slSpecials" value="Special[ ].desc + '- $' + Special[ ].price" type="singleList"/>
            </layout>
            <menu>
                    <item name="login" label="Login">
                            <action screen="scrLogin"/>
                            <condition pblock="chLoggedin" result="false"/>
                    </item>
                    <item name="order" label="Order">
                            <action screen="scrDelivery" param="Application.authenticatedUser"/>
                            <condition pblock="chLoggedin"/>
                    </item>
                    <item name="viewOrderStatus" label="View Orders Status">
                            <action screen="scrOrdersList"/>
                            <condition pblock="chLoggedin"/>
                    </item>
            </menu>
    </wcScr>
    <wcScr name="scrLogin" dialog="true">
            <layout type="vertical">
                    <layout type="flow">
                            <label name="lblUserName" value="User Name:"/>
                            <edit name="edUserName" type="char"/>
                    </layout>
                    <layout type="flow">
                            <label name="lblPassword" value="Password"/>
                            <edit name="edPassword" type="pwd"/>
                    </layout>
                    <button name="btnLogin" label="Login">
                            <event type="onClick" pblock="ahLogin" param="edUserName.value"/>
                    </button>
            </layout>
    </wcScr>
    <wcScr name="scrDelivery" title="Please provide delivery information" param="User">
            <layout type="vertical">
                    <layout type="flow">
                            <label name="lblStreet" value="Street:"/>
                            <edit name="street" mapping="User.street" type="char"/>
                    </layout>
                    <layout type="flow">
                            <label name="lblCity" value="City:"/>
                            <edit name="city" mapping="User.city" type="char"/>
                    </layout>
```

```
                <layout type="flow">
                    <label name="lblPostalCode" value="Postal code:"/>
                    <edit name="postalCode" mapping="User.postal" type="char"/>
                </layout>
                <layout type="flow">
                    <label name="lblPhone" value="Telephone:"/>
                    <edit name="phone" mapping="User.phone" type="phone"/>
                </layout>
                <layout type="flow">
                    <label name="lblDate" value="Date of delivery:"/>
                    <edit name="date" type="date"/>
                </layout>
            </layout>
            <menu>
                <item name="sendOrder" label="Send Order">
                    <action pblock="ahSendOrder" param="User"/>
                </item>
            </menu>
        </wcScr>
        <wcScr name="scrOrderStatus" title="Order status" param="Order[ ]">
            <layout type="vertical" param="%">
                <layout type="flow">
                    <label name="lblSpecialr" value="Special:"/>
                    <label name="lblSpecialMapped" value="@Order[ ].special"/>
                </layout>
                <layout type="flow">
                    <label name="lblConfNumber" value="Confirmation number:"/>
                    <label name="lblConfNumberMapped"
value="@Order[ ].orderStatus.confNumber"/>
                </layout>
                <layout type="flow">
                    <label name="lblStatus" value="Status:"/>
                    <label name="lblStatusMapped" value="@Order[ ].orderStatus.status"/>
                </layout>
                <layout type="flow">
                    <label name="lblConfDate" value="Date of last status update:"/>
                    <label name="lblConfDateMapped"
value="@Order[ ].orderStatus.datetime"/>
                </layout>
                <separator/>
            </layout>
            <menu>
                <item name="continue" label="Continue">
                    <action screen="scrSpecials"/>
                </item>
            </menu>
            <refresh>
                <msg> inOrderStatus </msg>
            </refresh>
        </wcScr>
        <wcScr name="scrOrdersList" title="Previous Orders">
            <layout type="vertical">
                <label name="lblInstructions" value="Select one or more order:"/>
                <choice name="mlOrderList" value="@Order[ ].datetime + '-' + @Order[ ].special"
mapping="Order[ ]" type="multiList"/>
            </layout>
            <menu>
                <item name="viewOrder" label="View Order">
                    <action screen="scrOrderStatus" param="mlOrderList.selected"/>
                </item>
            </menu>
        </wcScr>
        <wcFlow>
            <pblock id="chLoggedin">
                return Application.authenticatedUser != null;
            </pblock>
            <pblock id="ahLogin" param="User.name">
                if(User.passwordHash == Util.md5(scrLogin.edPassword) ) {
                    Application.authenticatedUser = User;
                    scrLogin.back( );
                } else {
                Dialog.display("Invalid login!");
                }
            </pblock>
            <pblock id="ahSendOrder" param="User">
                Order.orderId = Util.guid( );
                Order.special = scrSpecials.slSpecials.selected;
                Order.user = User;
                Order.datetime = scrDelivery.date;
```

-continued

```
            OrderStatus.confNumber = Util.guid( );
            OrderStatus.status = "Sent. Pending response.";
            OrderStatus.date = Util.currentDate( );
            Order.orderStatus = OrderStatus;
            outOrder.send( );
            scrOrderStatus.display(Order);
        </pblock>
        <pblock id="mhRemoveSpecial" param="inRemoveSpecial">
            Special.desc = inRemoveSpecial.desc;
            Special.delete( );
        </pblock>
    </wcFlow>
</wcApp>
```

As given above, the XML elements define the example component application 105 including a wcApp element, a wcData element, a wcMsg element, a wcSrc element, and a wcFlow element. Referring to FIG. 4, the wcApp element is a top-level element which defines the component application 105. The wcData element defines the example data component 400, which is comprised of a group of named, typed fields. The wcMsg element defines the example message component 404, which similarly defines a group of named, typed fields. The wcSrc element defines the example presentation component 402. The example presentation component 402 is a label, a separator, an image, a button, an edit field, a text area, a single-selection list, a multi-selection list, a drop-list, a checkbox, a radio button, or a screen containing a group of other presentation components 402. The presentation components 402 included in the example component application 105 define a login screen 500, a specials screen 502, a delivery information screen 504, an order list screen 508, and an order status screen 506. These screens would be presented on the user interface system of the device 100. The wcFlow element defines the example workflow components 406. The pblock attributes of the XML elements specify a pblock element nested in the wcFlow element. Each pblock element comprises script which defines part of the workflow of the component application 105. The script is written in ECMAScript by way of example only.

In order to define the behavior of the component application 105, the workflow components 406 use ECMAScript to reference and manipulate the data components 400, the presentation components 402, and the message components 404. Workflow components 406 can also reference external object types, which allow actions to be performed on the components defined in the component application 105. For example, a wcMsg type allows a message defined by a message component 404 to be evaluated to determine whether mandatory fields have been supplied, and to be sent to an external system such as the web service 106. A wcData type allows the size of collections of data entities defined by data components 400 to be determined, and allows data entities to be deleted. A wcScr type allows a presentation component 402 to be displayed to the user. Similarly, a special dialog external object allows a message to be displayed to the user on the user interface system of the device 100. The message components 404 relay the required data for the input and output of the messages of the application 105. The corresponding data components 400 coordinate the storage of the data in memory of the device 100 for subsequent presentation on the user interface system by the presentation components 402. The workflow components 406 coordinate the transfer of data between the data 400, presentation 402, and message 404 components. The workflow components 406 are written as a series of instructions, such as but not limited to ECMAScript, which is described above.

The above described component based application 105 architecture can result in component applications 105 in which the user-interface of the device 100 and the definition of the data are decoupled. This decoupling allows for modification of any component 400, 402, 404, 406 in the component application 105 while facilitating insubstantial changes to other components 400, 402, 404, 406 in the application 105, and thus can facilitate maintenance of the component applications 105, including modification and updating of the component applications 105 on the device 100.

Designer Tool 116 Architecture

FIG. 6 illustrates the overall designer tool 116 structure for designing component applications 105. The designer tool 116 interface (UI 202 and display 206—see FIG. 2) is primarily a user facing module 601 collection of graphical and text editors 600, viewers 602 and wizards 604. The large majority of external interactions are accomplished through one or more of these editors 600, with the developer/user, using a system of drag and drop editing and wizard driven elaboration. The secondary and non-user facing system interface is that of the "Backend", whereby the tool 116 connects to and digests datasource 106 services such as Web Services and SQL Databases. As described above, the tool 116 can be built on the Eclipse platform, whereby the user interface system components can be such as but not limited to components of editors 600, viewers 602, dialogs (not shown) and wizards 604, which are plug-in modules 601 that extend Eclipse classes and utilize the Eclipse framework, for example.

The tool 116 has a UI Layer 606 composed mainly of the editors 600 and viewers 602. The layer 606 has access to an extensive widget set and graphics library known as the Standard Widget Toolkit (SWT), for Eclipse. The UI layer 606 modules 601 can also make use of a higher-level toolkit called JFace that contains standard viewer classes such as lists, trees and tables and an action framework used to add commands to menus and toolbars. The tool 116 can also use a Graphical Editing Framework (GEF) to implement diagramming editors such as the Workflow Editor 702 and the Relationship Editor 704 (see FIG. 7). The UI layer 606 modules 601 can follow the Model-View-Controller design pattern where each module 601 is both a view and a controller. Data models 608, 610 represents the persistent state of the application 105 and are implemented in the data model layer 612 the tool 116 architecture. The separation of the layers 606, 612 keeps presentation specific information in the various views and provides for multiple UI modules 601 (e.g. editors 600 and viewers 602) to respond to data model 68, 610 changes.

The tool 116 data models 608, 610 can be based on the Eclipse Modeling Framework (EMF). EMF is a framework and code generation facility. The framework provides model 608, 610 change notification, persistence support and an efficient reflective API for manipulating EMF objects generically. The code generation facility is used to generate the model 608, 610 implementation and create adapters to connect the model layer 612 with the user interface system modules 601 of the UI layer 606.

A tool 116 service layer 614 provides facilities for the UI layer 606 such as validation, localization, generation, build and deployment. The tool 116 can make use of the Eclipse extension point mechanism to load additional plug-ins for two types of services: backend connectors 616 and device skins 618. The backend connector 616 defines an Eclipse extension point to provide for the tool 116 to communicate with or otherwise obtain information about different backend data sources 106, in order to obtain the message format of the selected data source 106. At runtime the tool 116 reads the plug-in registry to add contributed backend extensions to the set of backend connectors 616, such as but not limited to connectors for Web Services. The device skin 618 defines an Eclipse extension point to allow the tool 116 to emulate different devices 100 (see FIG. 1). At runtime the tool 116 reads the plug-in registry to add contributed skin extensions to the set of device skins 618, such as but not limited to skins for a generic BlackBerry™ or other device 100. As shown, the tool 116 communicates with backend data sources 106 and UDDI repositories 114 and registries 112. These external systems 106, 112, 114 may not be part of the tool 116 but are shown for completeness.

Referring to FIG. 6, the UI Layer 606 is comprised of the set of editors 600, viewers 602, wizards 604 and dialogs (not shown). The UI Layer 606 uses the Model-View-Controller (MVC) pattern where each UI module 601 is both a View and a Controller. UI Layer modules 601 interact with the data models 608,610 with some related control logic as defined by the MVC pattern. The editors 600 are modules 601 that do not commit model 608, 610 changes until the user of the tool 116 chooses to "Save" them. An example of an editor 600 is the Script Editor 706 (see FIG. 7), further described below. Viewers 602 are modules 601 that commit their changes to the model 608,612 immediately when the user makes them. An example of a viewer 602 is the Navigator (Project View) 802 (see FIG. 8). Wizards 604 are modules 601 that are step-driven by a series of one or more dialogs, wherein each dialog gathers certain information from the user of the tool 116 via the user interface system 202 (see FIG. 2). No changes are applied to the design time model 608 using the wizards 604 until the user of the tool 116 selects a confirmation button like a "Finish". It is recognised in the example plug-in design tool 116 environment, modules 610 can extend two types of interfaces: Eclipse extension points and extension point interfaces. Extension points declare a unique package or plug-in already defined in the system as the entry point for functional extension, e.g. an editor 600, wizard 604 or project. Extension point interfaces allow the tool 116 to define its own plugin interfaces, e.g. for skins 618 and backend 616 connectors.

Referring again to FIG. 6, modules 601 (primarily Editors 600 and Viewers 602) in the tool 116 are observers of the data models 608, 610 and are used to interact or otherwise test and modify the data models 608, 610 of the application (e.g. components 400, 402, 404, 406—see FIG. 4) in question. When the data model 608, 610 changes, the models 608, 610 are notified and respond by updating the presentation of the application 105. The tool 116 uses the Eclipse Modeling Framework (EMF), for example, to connect the Eclipse UI framework to the tool 116 data model 608, 610, whereby the modules 601 can use the standard Eclipse interfaces to provide the information to display and edit an object on the display 206 (see FIG. 2). In general, the EMF framework implements these standard interfaces and adapt calls to these interfaces by calling on generated adapters that know how to access the data model 608, 610 residing in memory 210. The design time Data Model 608 is the current version of the application 105 in development and is accessed by the users employing the modules 601 to interact with the associated data of the model 608. Modules 601 can also trigger validation actions on the Design Time Data Model 608. Modules 601 can also cause some or all of the application 105 to be generated from the Design Time Data Model 608 resident in memory 210. In general, the Design Time Data Model 608 accepts a set of commands via the UI 202 (see FIG. 2) that affect the state of the model 608, and in response may generate a set of events. Each module 601 (editor 600 and viewer 602) described includes the set of commands and the events that affect the module 601 and data model 608 pairing.

Referring to FIGS. 6 and 4, the Design Time Data Model 608 represents the state of an application 105 development project and interacts with the modules 601 of the UI layer 606 by notifying modules 601 when the state of the model 608 has changed as well as saving and loading objects from storage 210. The model's 608 primary responsibility is to define the applications 105 including such as but not limited to the following items: Data Component 400 Definitions; Global Variable Definitions; Message Component 404 Definitions; Resource Definitions; Screen Component 402 Definitions; Scripts 406; Style Definitions and Backend data source 106 Mapping Descriptors. The Design Time Data Model 608 responds to commands of each editor 600, viewer 602. The Design Time Data Model 608 also fires events to modules 601 in response to changes in the model 608, as well as collaborating/communicating with the other modules 601 (module 601-module 601 interaction) by notifying respective modules 601 when the data model 608 has changed. The data model 608 depends on a Resource interface in order to serialize to and from storage 210.

The following describes the mechanism used by the tool 116 editors 600 and viewers 602 to interact with the data model 608. The EMF.Edit framework is an optional framework provided by the Eclipse framework. The tool 116 can use the EMF.Edit framework and generated code (for exmple) as a bridge or coupling 613 between the Eclipse UI framework and the tool data model 608. Following the Model-View-Controller pattern, the editors 600 and viewers 602 do not know about the model 608 directly but rely on interfaces to provide the information needed to display and edit the data in the model 608.

In general, for example a tree viewer uses a TreeContentProvider and LabelProvider interface to query the structure of the tree and get text and icons for each node in the tree respectively. Table viewers and list viewers work in a similar way but use the structured ContentProvider and LabelProvider interfaces. Each class in the data model 608 is a change notifier, that is, anytime an attribute or reference is changed an event is fired. In EMF, for example, a notification observer is called an adapter because not only does it observe state changes but it can extend the behaviour of the class it is attached to (without subclassing) by supporting additional interfaces. An adapter is attached to a model object by an adapter factory. An adapter factory is asked to adapt an object with an extension of a particular type. The adapter factory is responsible for creating the adapter or returning an existing one, the model object does not know about adapting itself.

The tool 116 uses EMF to generate a set of adapters for the data model 608 called item providers. Each item provider is an adapter that implements provider interfaces to extend the behaviour of the model object so it can be viewed and edited and at the same time is a notification observer that can pass on state changes to listening views. The tool 116 connects the editors 600 and viewers 602 to the data model 608 by configuring the editors 600 and viewers 602 with one or more EMF.Edit classes, for example. Each EMF.Edit class supports an Eclipse UI provider interface. The EMF.Edit class implements an interface call by delegating to an adapter factory. The adapter factory then returns a generated adapter (an item provider) that knows how to access the data model 608. When the state of the model 608 changes the same adapters are used to update the viewers 602 and editors 600.

The following commands are example commands that can affect other related modules 601 of the UI layer 606: ComponentAdded—a component (i.e. Screen, Data etc.) has been added to the application 105; ComponentRemoved—a component has been removed from the application 105; ComponentRenamed—a component has been renamed; NavigationControlChanged—a button or menu item has been added, removed or had its properties changed on a screen (e.g. component 402) of the application 105; DataBindingChanged—a data-bound control (of a message 404, data 400 and/or presentation 402 component) has been added, removed or had its properties changed on a screen; ScreenParameterListChanged—a parameter has been added or removed from one of the screen components 402; FieldMappingChanged—a message level, field level or prototype mapping has changed; MessageContainmentChanged—a containment relationship has changed; MessageFieldChanged—a message field has been added, removed or had its properties changed for a message 404 and/or a screen 402 component; DataFieldChanged—a data field has been added, removed or had its properties changed from a message 404, data 400 and/or presentation 402 component; NavigationChanged—a script that may contain navigation code has changed of a workflow component 406; LocalizedStringChanged—a literal string has been added, removed or changed and ExitCodeChanged—Exit code has been added or removed from a script of the workflow component 406.

Figure 7:
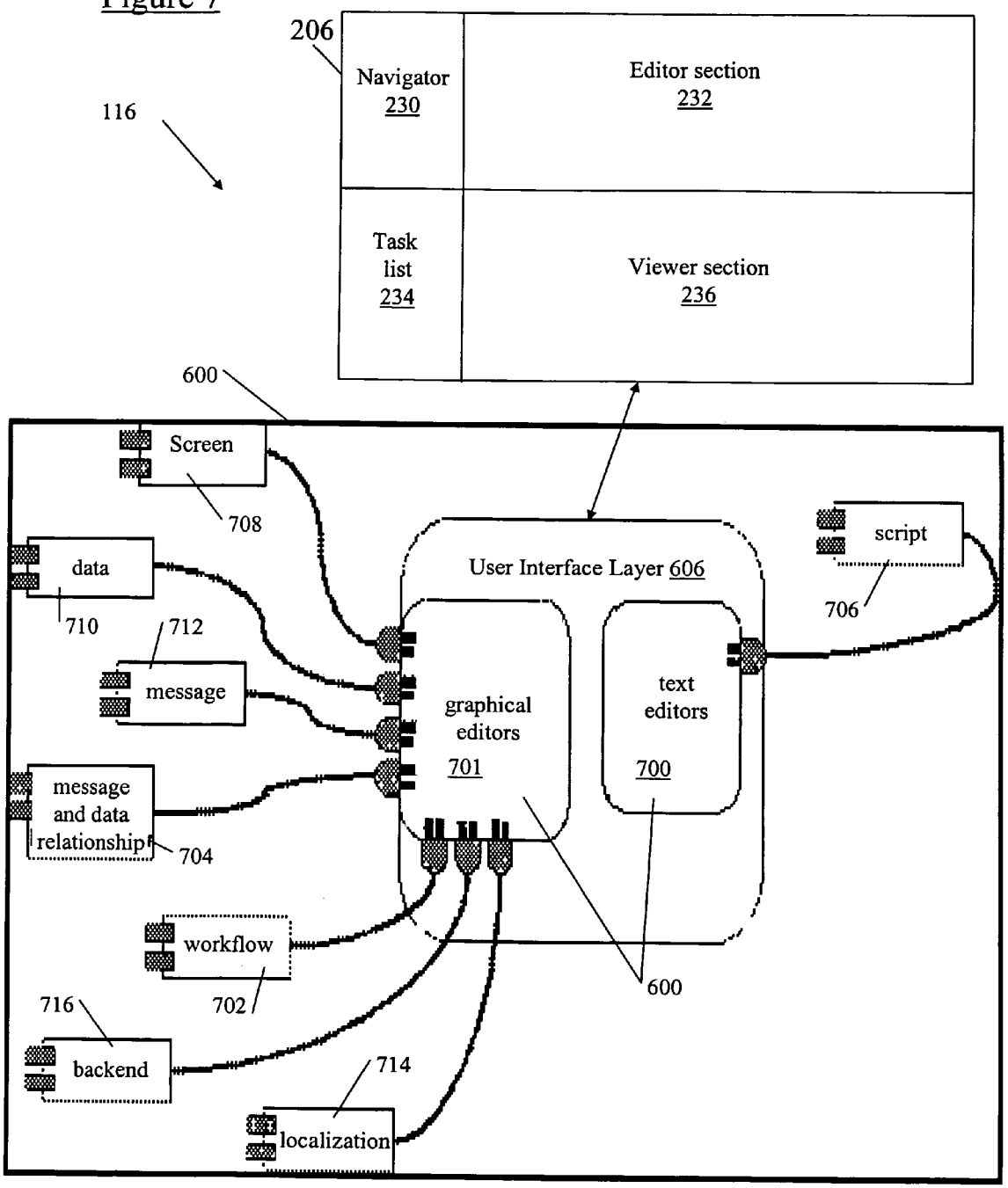
FIG. 7 shows editors of the tool of FIG. 6.

Referring to FIG. 7, the distribution of editors 600 in to Eclipse plug-ins (by way of example only) is shown. Tool editors 600 fall broadly into two categories, such as but not limited to the categories of: Text Editors 700 implement standard line based editing functionality and Graphical Editing Framework (GEF) Editors 701 that provide an edit space in which to draw objects. A GEF Editor 701 in the context of the tool 116 can contain a palette and a canvas, as is known in the art. The user can drop nodes (entities) from the palette onto the canvas and add connections (relationships) between them, so as to for example define the content and inter-relationships of the XML coding of the components 400, 402, 404, 406 (see FIG. 4). It is recognised that the editors 600 and viewers 602 are used to create and modify definitions contained in the components 400, 402, 404, 406 s well as to create and modify the interdependancies of the definitions between the components (e.g. data-data, data-screen, message-data, screen-data, data-message) as further discussed below. It is recognised that the viewers 602 and editors 600 can be any combination of text based and/or graphical based modules 601, as desired.

Editors 600

For Editor 600 and Data Model 608 decoupling, the editor 600 does not know about the data model 608 directly. The editor 600 relies on a UI provider interface (of Eclipse) to get the information needed to render the object under edit. The editor 600 can be configured with an EMF core object, for example when using the Eclipse platform) that implements a UI provider interface. e.g. ContentProvider, LabelProvider. The EMF provider object adapts UI calls by delegating to a generated adapter (ItemProvider) that knows how to access the data model 608.

In general, the editor 600 creates a command to change the model 608 so that the change can be undone through an undo API (not shown). The editor 600 can be configured with an EMF core object called an editing domain that maintains a command stack. The editing domain uses the adapter factory to find an adapter that can create the command. The generated adapter class (an ItemProvider) creates the command. The editor 600 executes the command by using the command stack. Further, using the Eclipse framework as an example, EMF models 608 are change notifiers. Because the ItemProvider is a notification observer it is notified when the data model 608 changes. The ItemProvider in turn notifies the Provider. The Provider tells the Editor 600 and PropertySheet to refresh after a change notification.

Script Editor 706

The script editor is a constrained text editor for writing the commands (e.g. JavaScriptTM) of the application 105 components, such as but not limited to the workflow component 406 —see FIG. 4. Some syntax such as creating functions can be restricted where it is not user-definable in the component application 105. Example commands editable by the script editor 706 can include commands such as but not limited to .SaveScript which is used when the user saves a script of the application 105. SaveScript can trigger the data model 608 commands of NavigationChanged, Localized.StringChanged and ExitCodechanged, if successful. Example input events of the script editor 706 can include events such as but not limited to: ComponentRemoved whereby if the component (400, 402, 404, 406) removed affects input parameters to the script or globals used by the script, the script editor 706 prompts the user of the tool 116 that the modified script is invalid; and ComponentRenamed which has the same interest as ComponentRemoved. An example interface of the script editor 706 extends the org.eclipse.ui.editors extension point of the Eclipse framework by implementing a subclass of the org.eclipse.ui.editors.texteditors hierarchy. The tool 116 coordinated the creation and/or modification of scripts in the (e.g. workflow 406) components as well as the inter-relation of the created/modified script affecting other associated components of the application 105.

Screen Editor 708

The screen editor 708 is responsible for facilitating the user of the tool 116 to define and laying out the structured definition language code (e.g. XML) in the screen components 402 of the application 105 associated with display of data on the device 100. UI controls for inclusion in the screen components 402 can be dropped onto a form canvas (not shown) in the editor section 232 of the display (see FIG. 206). Control properties including event handlers can also be edited by the screen editor 708.

Example commands editable by the screen editor 708 can include commands such as but not limited to: ButtonChange which is sent (to the data model 608) when the developer changes a button control, this command triggers NavigationControlChange of the data model 608 if successful; MenuItemChange which is sent when the developer changes a menu item, this command triggers NavigationControlChanged of the data model 608 if successful; ChangeScript which is sent when the developer changes a script, this command triggers NavigationControlChanged of the data model 608 if successful; QueryMessages which is sent when the developer needs a list of available messages that screen of the application 105 may send or refresh on, and returns a list of available messages; QueryData which is sent when the developer needs a list of available data objects to bind controls to, and returns a list of available data; NonNavigationControlChange which is sent when a control that does not affect navigation (e.g. label, text field) has been modified; and DataBindingChange which is sent when a databinding has changed, this command triggers DataBindingChanged and ScreenParameterListChanged of the data model 608 if successful. Example input events of the screen editor 708 can include events such as but not limited to: ComponentRemoved whereby the screen developer (user of the tool 116) checks to see if the component is a message the associated screen component 402 is using for navigation, a Data object that the screen component 402 has controls bound to or a script (e.g. workflow component 406) that handles a screen event of the screen component 402; ComponentRenamed has the same interest as ComponentRemoved; ScreenParameterListChanged modifies the screen component 402 such as if a parameter that was in use has been changed, the screen component 402 must either adjust that parameter or warn the developer that those dependencies are no longer valid and must be changed; MessageFieldChanged whereby the Screen developer checks to see if the field in question is in use by the screen component 402; and DataFieldChanged whereby the Screen developer checks to see if any controls were bound to the field(s) that have changed and warns the developer appropriately.

An example interface of the screen editor 708 extends org.eclipse.ui.editors of the Eclipse framework using the GEF GraphicalEditor and/or a VE editor. The tool 116 coordinates the creation and/or modification of screen definitions in the (e.g. screen 402) components as well as the inter-relation of the created/modified screen definitions (and associated data definitions) affecting other associated components of the application 105.

Data Editor 710

The data editor 710 is responsible for facilitating the user of the tool 116 to create and modify the structured definition language code (e.g. XML) in the data components 400 (and possibly screen 402 and message 404 components) of the application 105 by providing the developer the ability to edit a Data Component 400 fields and properties. New Data objects can be created from scratch, by prototyping existing Data objects or based on data definition mappings to Message objects in message components 404.

Example commands editable by the data editor 710 can include commands such as but not limited to: AddRemoveFields which is sent when the developer adds or removes a field from a Data object definition, this command triggers DataFieldChanged of the data model 608 if successful; LinkToExternalData which is sent when the developer links a data object definition to an external (to the application 105) Data object, such as but not limited to a Calendar or Contacts data object, this command triggers DataFieldChanged of the data model 608 if successful.

Example input events of the data editor 710 can include events such as but not limited to: ComponentRemoved whereby the screen developer (user of the tool 116) checks to see if the object that was removed was related to the message through prototyping or containment, then the developer can adjust the fields contained in the Data object affected; and ComponentRenamed has the same interest as in ComponentRemoved.

An example interface of the screen editor 708 extends org.eclipse.ui.editors using the GEF GraphicalEditor. The tool 116 coordinates the creation and/or modification of data definitions in the (e.g. data 400) components as well as the inter-relation of the created/modified data definitions (and associated screen/message definitions) affecting other associated components of the application 105.

Message Editor 712

The message editor 712 is responsible for facilitating the user of the tool 116 to create and modify the structured definition language code (e.g. XML) in the message components 404 of the application 105. The message designer provides for the developer to create and edit component messages that are sent to and arrive from the backend data sources 106 (in relation to the device 100). These messages can include both request/response pairs as well as subscribe/notify/unsubscribe notification messages. Message definitions can be created by prototyping existing messages or by templating based on back-end services of the data sources 106 such as WSDL and JDBC/SQL.

Example commands editable by the message editor 712 can include commands such as but not limited to: AddRemoveFields which is sent when the developer adds or removes field from a message in a message component 404. Example input events of the message editor 712 can include events such as but not limited to: ComponentRemoved whereby the screen developer (user of the tool 116) checks to see if a message that this message definition prototypes or contains has been removed, then the view must be updated; ComponentRenamed has the same interest as ComponentRemoved; and FieldMappingChanged whereby the screen developer (user of the tool 116) checks to see if the field mapping effects the message definitions being edited, then the Message developer checks to see if any message fields have been added/removed/renamed by the change in the mapping.

An example interface of the screen editor 708 extends org.eclipse.ui.editors using the GEF GraphicalEditor. The tool 116 coordinates the creation and/or modification of message definitions in the (e.g. message 404) components as well as the inter-relation of the created/modified message affecting other associated components of the application 105.

Workflow Editor 702

The workflow editor 702 is responsible for facilitating the user of the tool 116 to create and modify the command code (e.g. ECMA Script) in the workflow components 406 of the application 105. The workflow editor 702 defines the screen-to-screen transitions that form the core of the visual part of the component application 105. Screens and transitions between screens due to user/script events are rendered visually.

Example commands editable by the workflow editor 702 can include commands such as but not limited to: QueryScreens which is sent when the developer wants a list of screens to select from, such as when adding a new screen to the workflow; QueryScripts which is sent when the developer wants a list of scripts to call on a screen navigation event; QueryArrivingMessages which is sent when the developer wants a list of response messages (including notifications) on which to key screen transitions; AddComponent which is sent when the developer wants to add a new screen, message or script to the workflow that doesn't already exist in the workflow, this command triggers ComponentAdded of the data model 608 if successful; and ChangeNavigation which is sent when the developer adds a new navigation to the workflow, this command triggers NavigationChanged of the data model 608 if successful.

Example input events of the workflow editor 702 can include events such as but not limited to: ComponentRemoved whereby the workflow developer (user of the tool 116) checks to see if the component is a workflow object (Screen, Script, Arriving Message), then the Workflow updates itself by deleting all relationships with this object definition; ComponentRenamed whereby the workflow developer (user of the tool 116) checks to see if the component is a workflow object, then the workflow updates its visual with the new name of the component; NavigationControlChanged whereby the workflow developer (user of the tool 116) checks to see if the workflow must update its view of the navigation based on the control change, if for example a button has been added to a screen in the workflow, then the view is updated to show the availability of a new navigation node on that screen; ScreenParameterListChanged whereby the workflow developer (user of the tool 116) checks to see if a screen's parameter list has changed and that screen is in the workflow, then the developer updates the view of any navigation involving that screen; Navigation Changed whereby the workflow developer (user of the tool 116) checks to see if apossible navigation change has occurred, the developer finds and parses the change and makes any necessary updates to the view; and ExitCodeChanged whereby the workflow developer (user of the tool 116) checks to see if an exit point has been added/removed, then editor view is updated to reflect this visually. An example interface of the screen editor 708 extends org.eclipse.ui.editors using the GEF GraphicalEditor.

Message-Data Relationship Editor 704

The message editor 704 is responsible for facilitating the user of the tool 116 to create and modify the structured definition language code (e.g. XML) in the inter-related message 404 and data 400 components of the application 105. The message/data relationship editor creates and edits relationships between Message Components 404 and Data Components 400. These mappings effect how a Data Component 400 is populated on Message arrival to the device 100 when running the application 105. For example, data object definitions common between data 400 and message 404 components can be such that the data object definitions can be resident in the data component 400, while a only data mapping definition (stating where the data object definition(s) can be found) linking the message component 404 to the data object definition in the data component 400 can be resident in the message component 404, or vice versa. A similar configuration can be employed for data object definitions common between screen 402 and data 400 components, whereby the data object definition is resident in one of the components and the data mapping definition is resident in the other associated component, as further described below in relation to the screen-data relationship viewer 804 (see FIG. 8).

Example commands editable by the editor 704 can include commands such as but not limited to: AddComponent which is sent when the user adds a new Data or Message to the relationship diagram with the effect of also adding that component to the application 105 being developed, this command triggers ComponentAdded of the data model 608 if successful; QueryMessages which is sent when the developer needs a list of Messages to map; QueryData which is sent when the developer needs a list of Data to map; ChangeMessageLevelMapping which is sent when the developer changes a message level mapping, this command triggers FieldMappingChanged of the data model 608 if successful; ChangeFieldLevelMapping which is sent when the developer changes a field level mapping, this command triggers FieldMappingChanged of the data model 608 if successful; ChangePrototype which is sent when the developer changes (adds/removes) a prototype relationship between Data objects, this command triggers FieldMappingChanged of the data model 608 if successful; and ChangeContainment which is sent when the developer changes a containment relationship between Data objects, this command triggers MessageContainmentChanged of the data model 608 if successful.

Example input events of the editor 704 can include events such as but not limited to: ComponentRemoved whereby the developer (user of the tool 116) checks to see if the object removed was a Message or Data, the relationship mapper deletes any relationships involving the removed object; ComponentRenamed whereby the developer (user of the tool 116) checks to see if the renamed object is involved in any mapping relationships, the visual representation of the mapped object is updated with the new name; MessageFieldChanged whereby the developer (user of the tool 116) checks to see if the message concerned is present in the relationship editor, then field change is reflected in the visual representation of the message, if the field in question is involved in a mapping, then changes are reflected and the developer may need to be warned of broken mappings (if for example, a field has been removed); and DataFieldChanged has the same interest as MessageFieldChanged except with Data instead of Messages.

An example interface of the editor 704 extends org.eclipse.ui.editors using the GEF GraphicalEditor. The tool 116 coordinates the creation and/or modification of message/data definitions in the (e.g. message/data 404/400) components as well as the inter-relation of the created/modified message/data definitions affecting other associated components of the application 105.

Localization Editor 714

The localization editor 714 provides for the developer to collect all strings that will be visible to the application 105 end-user (of the device 100) and edit them in one place. The editor 714 also provides for the developer to create multiple resource mappings for each string into different languages. Example commands editable by the editor 714 can include a command such as but not limited to: ChangeLocalizeString which is sent when the developer adds, deletes or modifies a localized string. An example input event of the editor 714 can include an event such as but not limited to: LocalizedStringChanged which is used to determine when a string literal has been changed in the script editor or a label has changed in the screen editor 708. The Localization Editor 714 can extend the org.eclipse.ui.editors interface by extending an EditorPart.

Backend Visualizer Editor 716

The backend visualizer 716 shows the developer the relationships between Message Components 404 and the backend data sources 106 (web services, SQL etc.—see FIG. 1) that drive the components 404. The editor 716 also provides for the developer to add new sources 106 to the list of those supported by the application 105 in development. In addition to interaction with the design time data model 608, as is described for other modules 601 using commands and events received, the Backend Visualizer editor 716 collaborates with the Backend Connector 616 (see FIG. 6). The Backend Connector 616 provides for the visualizer to request a ServicesInterface from a registry of known service types (e.g. Web Services, SQL Databases). A list of Services of this type is returned that can queried by name or by iteration.

Example commands editable by the editor 716 can include commands such as but not limited to: AddComponent which is sent when the developer adds a new message, this command triggers ComponentAdded of the data model 608 if successful; and SpecifyMapping which is sent when the developer connects a message to a selected backend data source 106. Example input events of the editor 716 can include events such as but not limited to: ComponentRemoved whereby the developer (user of the tool 116) checks to see if the component is a message, the backend visualizer adjusts its mappings for that message; ComponentRenamed has the same interest as ComponentRemoved; and MessageFieldChanged whereby the developer (user of the tool 116) validates the message field against what exists on the backend and visually notifies of any broken mappings. Backend data sources 106 are accessed through direct calls to the service layers. Optionally, background processing may be used to keep network processing from blocking UI threads. The Editor 716 can extend the org.eclipse.ui.editors using the GEF GraphicalEditor.

Viewers 602

Figure 8:
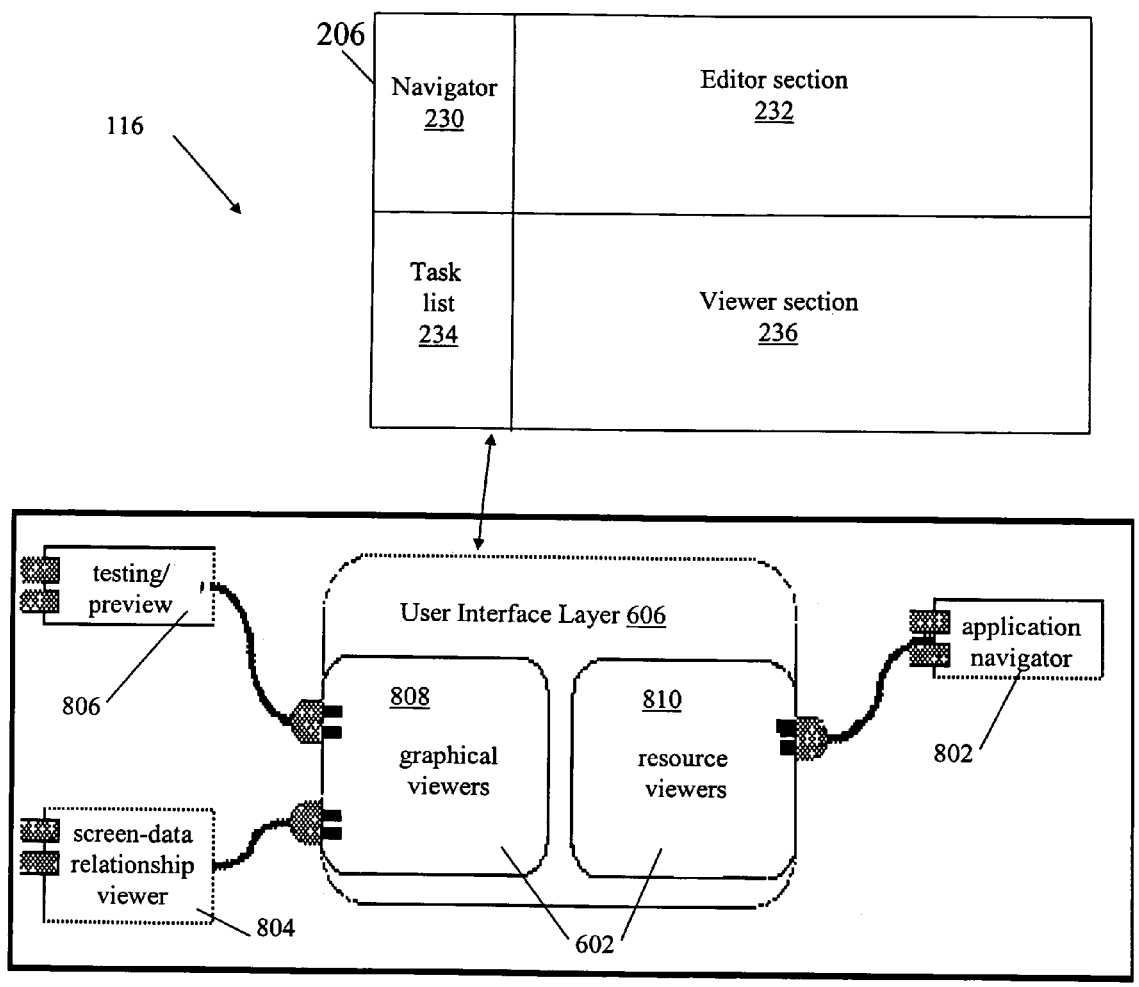
FIG. 8 shows viewers of the tool of FIG. 6.

Referring to FIGS. 6 and 8, viewers 602 are modules 601 that commit their changes to the data model 608 as soon as the developer makes them. Referring to FIG. 8, the distribution of viewers 602 in to Eclipse plug-ins (by way of example only) is shown. Tool viewers 602 fall broadly into two categories, such as but not limited to the catgories of: Resource viewers 810 and Graphical Editing Framework (GEF) viewers 808, which provide an edit space in which to view objects. The user can view nodes (entities) and connections (relationships) between them, so as to for example define the content and inter-relationships of the XML coding of the components 400, 402, 404, 406 (see FIG. 4). It is recognised that the viewers 602 are used to create and modify definitions contained in the components 400, 402, 404, 406 s well as to create and modify the interdependancies of the definitions between the components (e.g. data-data, data-screen, message-data, screen-data, data-message) as further discussed below. The Eclipse viewers are modules 601 that commit changes to the data model 608 as soon as the user makes one. The Viewers 602 include: the Navigator 802 which shows a hierarchical view of the application 105 projects in the workspace of the display 206 (see FIG. 2) realized by a tree view (for example); a Testing/Preview viewer 806 that emulates the runtime behaviour of the application 105 and the Screen-Data Relationship viewer 804 that can be a read-only view of the relationships between a screen 402 and the data 400 components that are bound to the respective screens. Each viewer 602 can create an extension point at org.eclipse.ui.views and can implement the IViewPart interface of the Eclipse platform, usually through a selected default super-class.

Navigator Viewer 802

The Navigator 802 provides the developer with a hierarchical tree view (for example) of all the project applications 105, folders and files in the workspace of the display 206. The developer can browse and manipulate the objects definitions associated with the selected application 105 project from the Navigator 802.

Example commands by the viewer 802 can include commands such as but not limited to: AddComponent which is sent when a new component is added to the application 105 project through a New menu on a navigator context menu (not shown), this command triggers ComponentAdded of the data model 608 if successful; RemoveComponent which is sent when a component is removed by deleting it from the navigator context menu, this command triggers ComponentRemoved of the data model 608 if successful and RenameComponent which is sent when a component is renamed by selecting it in the navigator, this command triggers ComponentRenamed of the data model 608 if successful.

Example input events of the viewer 802 can include events such as but not limited to: ComponentAdded for when a component is added, the navigator 802 refreshes its view of the project application 105 and ComponentRemoved has the same interest as ComponentAdded. Example interfaces for the navigator viewer 802 is such that the viewer 802 extends the org.eclipse.ui.views extension by sub-classing org.eclipse.ui.views.navigator.ResourceNavigator, by example for the Eclipse framework.

Screen Data Relationship Viewer 804

The Screen/Data viewer 804 provides for the developer to view the relationships between a given screen definition and the Data definition that is bound to it. The interface can be read-only and is constructed from design time data contributed by the associated Screen 404 and Data 400 components. For a read only viewer 804, the viewer 804 does not have any commands that affect the data model 608. Example input events of the viewer 804 can include events such as but not limited to: ComponentRemoved whereby the developer (user of the tool 116) checks to see if the component removed is a Screen 402 or Data 400 component, the developer removes any relationships with the removed component; DataBindingChanged whereby the developer (user of the tool 116) checks to see if the component is a Screen 402 or a Data 400 component and is currently open in the viewer 804, then the name of the component is updated and ComponentRenamed whereby the developer (user of the tool 116) checks to see if the DataBinding involves a Screen 402 and/or Data 400 components that are currently open, then any new relationships are depicted in the view of the display 206 (see FIG. 2). The viewer 804 can extend org.eclipse.ui.editors using the GEF GraphicalEditor, but as a "read-only" editor view.

Testing/Preview Viewer 806

The Testing/Preview viewer 806 emulates the runtime behavior of the application 105 outside of the device 100 (on the designer's computer 201—see FIG. 2). The viewer 806 interacts with: the ☐Skin Manager 618 of the service layer 614 (see FIG. 6) such that a collection of skin plug-ins are managed for the emulated device 100; the Runtime Data Model 610 that models the properties and state of the emulated application 105 and the ☐Design Time Data Model 608 that provides the metadata for the emulated application 105, such as what visual elements exist on a screen and how they are to be laid out.

Figure 9:
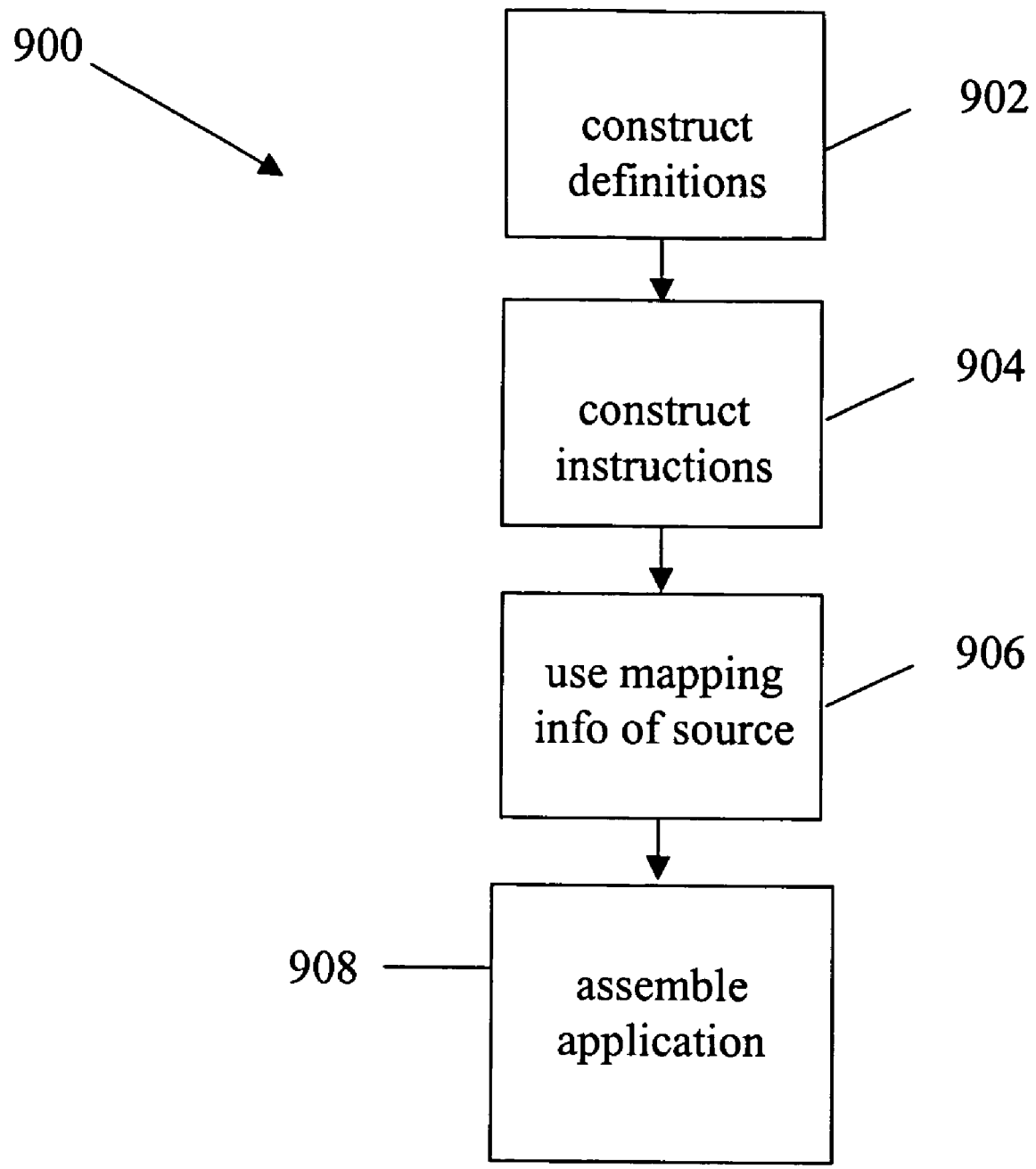
FIG. 9 shows a method of implementing the tool of FIG. 2 for application development.

Referring to FIGS. 1 and 9, a method 900 is shown for developing the application 105 having component 2 400, 402, 404 with descriptors expressed in a structured definition language and component 406 expressed as a series of instructions. It is recognised that individual components 400, 402, 404, 406 interact for processing messages on the runtime environment RE of the device 100 that are received from the datasource 106 over the network 10. In constructing the application 105, the definitions of the components 400, 402, 404 are developed 902 through interaction with the data model 608, the model 608 for providing a persistent state of the application. The instructions of the second component are developed 904 through interaction with the data model 608. Message mapping information of the data source 106 selected for the application 105 is obtained 906 for assisting in the generation of the definitions based on the mapping information. Once completed, the components 400, 402, 404, 406 are assembled 908 into the application 105.

Although the disclosure herein has been drawn to one or more exemplary systems and methods, many variations will be apparent to those knowledgeable in the field, and such variations are within the scope of the application. For example, although XML and a subset of ECMAScript are used in the examples provided, other languages and language variants may be used to define component applications. The proposed E4X standard scripting languages could be used in place of ECMAScript, for example. Further, other structured definition languages, than XML described above, can include such as but not limited to Resource Description Framework (RDF), XSLT, and XHTML.

The invention claimed is:

1. A computing device for developing a client application configured to facilitate communication over a network between an electronic device and a data source having a schema-based service interface, the client application comprising a plurality of interacting components configured for processing one or more messages that are received from the data source over the network, the computing device comprising:
a memory storing instruction for execution by a processor to provide:
a first module generating a first component of the plurality of interacting components through interaction with a data model that provides a persistent state of the client application being developed, the first component including message descriptors expressed in a structured definition language for defining a message format of the messages;
a second module generating a series of instructions of a second component of the plurality of interacting components through interaction with the data model, the series of instructions in a scripting language for defining action to be performed by the client application in response to receiving the messages; and
a backend connector selecting the schema-based service interface and for providing a message definition of the selected schema-based service interface to the first module, the first module generating the message descriptors in the message format based on the message definition;
wherein the first and second components developed by respective the first and second modules are included in the plurality of interacting components of the client application for subsequent execution on the electronic device.

2. The computing device of claim 1, wherein each of the modules further comprise a command for accessing and changing the state of the data model.

3. The computing device of claim 2, wherein the data model contains elements selected from the group comprising: Data Component Definitions; Global Variable Definitions; Message Component Definitions; Resource Definitions; Screen Component Definitions; Scripts; Style Definitions; and Mapping Descriptors of the data source.

4. The computing device of claim 2, wherein at least one of the modules is affected by an event notification from the data model in response to the command.

5. The computing device of claim 2, wherein the modules are selected from the group comprising editors and viewers.

6. The computing device of claim 5, wherein the modules are selected from the group comprising: a screen module; a data module; a message module; a workflow module; a message and data relationship module; a backend visualize module; a localization module; a script editor module; a testing module, a data and screen relationship module; and a navigation module.

7. The computing device of claim 2, wherein the components are selected from the group comprising: data; screen; message; and workflow.

8. The computing device of claim 7, wherein the command is selected from the group comprising: adding one of the components to the application; removing one of the components from the application; renaming a component; changing or adding a navigation control of a screen element of the screen component; changing or adding a data binding of a data-bound control; changing or adding a parameter list of one of the components; changing or adding a field mapping; changing or adding a containment relationship; changing or adding a message field for the message or the screen component of the application; changing or adding a data field of the message, data or presentation component of the application; changing or adding a navigation code of a script; changing or adding a literal string and changing or adding an exit of a script of the workflow component.

9. The computing device of claim 2 further comprising the data model and the modules being decoupled for controlling the application of the state changes to the data model such that the system includes a model layer having the data model and a user interface system layer having the modules, the model layer coupled to the user interface system layer.

10. The computing device of claim 7, wherein the first module creates and edits relationships between data component elements and elements of components selected from the group comprising message components and screen components.

11. A method for generating a client application configured to facilitate communication over a network between an electronic device and a data source having a schema-based service interface, the client application comprising a plurality of interacting components configured for processing one or more messages that are received from a data source over the network, the method comprising the steps of:
generating a first component of the plurality of interacting components through interaction with a data model that provides a persistent state of the client application being developed, the first component including message descriptors expressed in a structured definition language for defining a message format of the messages;
generating a series of instructions of a second component of the plurality of interacting components through interaction with the data model, the series of instructions written in a scripting language for defining an action to be performed by the client a location in response to the messages; and
selecting the schema-based service interface and providing a message definition of the selected schema-based service interface for assisting in the generation of the message descriptors in the message format based on the message definition;
wherein the developed first and second components are included in the plurality of interacting components of the client application for subsequent execution on the electronic device.

12. The method of claim 11 further comprising the step of accessing and changing the state of the data model using a command.

13. The method of claim 12, wherein the data model contains elements selected from the group comprising: Data Component Definitions; Global Variable Definitions; Message Component Definitions; Resource Definitions; Screen Component Definitions; Scripts; Style Definitions; and Mapping Descriptors of the data source.

14. The method of claim 12 further comprising the step of affecting the generation of the definitions by an event notification from the data model in response to the command.

15. The method of claim 12, wherein the development of the instructions and the definitions are implemented by modules of a user interface system, the modules selected from the group comprising editors and viewers.

16. The method of claim 15, wherein the editors and viewers are selected from the group comprising: a screen module; a data module; a message module; a workflow module; a message and data relationship module; a backend visualize module; a localization module; a script editor module; a testing module, a data and screen relationship module; and a navigation module.

17. The method of claim 12, wherein the components are selected from the group comprising: data; screen; message; and workflow.

18. The method of claim 17, wherein the command is selected from the group comprising: adding one of the components to the application; removing one of the components from the application; renaming a component; changing or adding a navigation control of a screen element of the screen component; changing or adding a data binding of a data-bound control; changing or adding a parameter list of one of the components; changing or adding a field mapping; changing or adding a containment relationship; changing or adding a message field for the message or the screen component of the application; changing or adding a data field of the message, data or presentation component of the application; changing or adding a navigation code of a script; changing or adding a literal string and changing or adding an exit of a script of the workflow component.

19. The method of claim 15, wherein the data model and the modules are decoupled for controlling the application of the state changes to the data model, the user interface system includes a model layer having the data model and a user interface system layer having the modules, the model layer coupled to the user interface system layer.

20. The method of claim 17 further comprising the step of creating and editing relationships between data component elements and elements of components selected from the group comprising message components and screen components.

21. A computer readable medium storing instructions, which when executed by a processor on a computing device cause the computing device to generate a client application configured to facilitate communication over a network between an electronic device and a data source having a schema-based service interface, the client application comprising a plurality of interacting components configured for processing one or more messages that are received from a data source over the network, the instructions for implementing the steps of:

generating a first component of the plurality of interacting components through interaction with a data model that provides a persistent state of the client application being developed, the first component including message descriptors expressed in a structured definition language for defining a message format of the messages;

generating a series of instructions of a second component of the plurality of interacting components through interaction with the data model, the series of instructions written in a scripting language for defining an action to be performed by the client application in response to the messages; and selecting the schema-based service interface and providing a message definition of the selected schema-based service interface for assisting in the generation of the message descriptors in the message format based on the message definition;

wherein the developed first and second components are included in the plurality of interacting components of the client application for subsequent execution on the electronic device.

* * * * *